United States Patent
Tamada et al.

(10) Patent No.: US 6,987,616 B2
(45) Date of Patent: Jan. 17, 2006

(54) LIGHT REFLECTION/DIFFRACTION DEVICE, LIGHT REFLECTION/DIFFRACTION DEVICE ARRAY, AND IMAGE DISPLAY

(75) Inventors: Hitoshi Tamada, Kanagawa (JP); Ayumu Taguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/479,488

(22) PCT Filed: Apr. 4, 2003

(86) PCT No.: PCT/JP03/04340

§ 371 (c)(1),
(2), (4) Date: Dec. 3, 2003

(87) PCT Pub. No.: WO03/085441

PCT Pub. Date: Oct. 16, 2003

(65) Prior Publication Data

US 2004/0246559 A1  Dec. 9, 2004

(30) Foreign Application Priority Data

Apr. 4, 2002 (JP) .............................. 2002-103033
Mar. 11, 2003 (JP) .............................. 2003-065703

(51) Int. Cl.
*G02B 5/18* (2006.01)
*G02B 26/00* (2006.01)
*H04N 3/08* (2006.01)

(52) U.S. Cl. .................... 359/573; 359/291; 348/203
(58) Field of Classification Search ................ 359/223, 359/224, 279, 290–292, 295, 298, 563, 566, 359/572, 573, 575; 345/108; 348/203
See application file for complete search history.

(56) References Cited

U.S. PATENT DOCUMENTS

2002/0001120 A1    1/2002   Mochizuki ................... 359/260
2002/0015230 A1    2/2002   Pilossof et al. ............. 359/558

*Primary Examiner*—Georgia Epps
*Assistant Examiner*—William Choi
(74) *Attorney, Agent, or Firm*—Frommer Lawrence & Haug LLP; William S. Frommer; Darren M. Simon

(57) ABSTRACT

A light reflection and diffraction element for enhancing the contrast of an image display device. In an off state of the element, a portion exhibiting a cyclic structure for diffracting incident light in a region where reflective members having reflection surfaces are aligned is reduced by preventing the generation of unrequired diffracted light. For example, by covering connection regions of the ribbon reflective members by light shielding masks, incident light is shielded. Preferably, any uneven state of the reflection surfaces of the ribbon reflective members is controlled, and a correlation length is made small.

18 Claims, 14 Drawing Sheets

LIGHT REFLECTION/DIFFRACTION DEVICE, LIGHT REFLECTION/DIFFRACTION DEVICE ARRAY, AND IMAGE DISPLAY

TECHNICAL FIELD

The present invention relates to a light reflection and diffraction element for diffracting or reflecting light, a light reflection and diffraction element array, and an image display device using a light reflection and diffraction element array to display a two-dimensional image.

BACKGROUND ART

In a projector or printer or other image display device, in order to raise the resolution of the image, the method of scanning the light from a one-dimensional image display device by a light scanning means and projecting it on an imaging means to form a two-dimensional image has been known (U.S. Pat. No. 5,982,553). As a one-dimensional image display device, a grating light valve (GLV) element proposed by Silicon Light Machines of the U.S. is known (Japanese Patent No. 3164824, U.S. Pat. No. 5,841,579).

A GLV element is a micro-machine phase reflection type grating utilizing the diffraction of light. It reflects incident light as reflected light having no optical path difference in a first state and reflects the incident light giving it an optical path difference in a second state to generate diffracted light by the diffraction phenomenon.

If applying GLV elements to an image display device, the elements exhibit a dark state when the diffracted light is not generated and give diffracted light becoming a digital image when the incident light is diffracted. Namely, by scanning the diffracted light from one-dimensionally arrayed GLV elements by a scan mirror, a two-dimensional image is obtained.

Compared with a usual two-dimensional image display device using a liquid crystal panel etc., in the case of an image display device using GLV elements, the number of elements in the vertical direction becomes the same. In the horizontal direction, however, single one-dimensionally arrayed GLV elements are sufficient, so the structure of the element required for displaying a two-dimensional image becomes simpler. Further, the elongated ribbon-like electrode portions of GLV elements referred to as "ribbon reflective members" are very small in size (for example, about 1×40 µm), have a high switching speed of reflection and diffraction and a wide bandwidth, and, when applying GLV elements to an image display device, enable display of a high resolution and a high speed. Further, GLV elements operate with a low applied voltage, so consume little electric power. If considering the above, if using GLV elements, realization of an image display device having a very small size, a high resolution, and a high response speed can be expected.

The basic configuration and operation principle of a GLV element will be explained in brief by referring to FIG. 1 to FIG. 3.

FIG. 1 is a partial perspective view of a GLV element for displaying a one-dimensional image.

As shown in FIG. 1, a GLV element 1 has a substrate 12 serving as a common electrode and ribbon reflective members 10a, 11a, 10b, 11b, 10c, 11c, and 10d comprised of elongated ribbon-like (stripe-like) reflective members arranged facing each other across predetermined intervals (gaps). The ribbon reflective members 10a, 11a, 10b, 11b, 10c, 11c, and 10d have reflective coatings (not illustrated) for reflecting light formed on their upper surfaces and become the reflective members for reflecting light incident from above.

The ribbon reflective members 10a, 11a, 10b, 11b, 10c, 11c, and 10d are grouped into alternately arranged members. The ribbon reflective members 11a, 11b, and 11c (indicated together as "11") of a first group and the common electrode substrate 12 are held at a ground potential. Since they have the same potential, no electrostatic force is induced with the common electrode substrate 12 and they do not move (are not displaced) toward the common electrode substrate 12. The ribbon reflective members 11 which do not move and are fixed in this way will be referred to as "fixed ribbon reflective members". The ribbon reflective members 10a, 10b, 10c, and 10d (indicated together as "10") of a second group become the ground potential in the first state. They are located at the same reflection plane as the fixed ribbon reflective members 11 of the first group, but when a drive voltage PWR is applied in a second state, electrostatic force acts between the common electrode substrate 12 and the ribbon reflective members 10a, 10b, 10c, and 10d to which the drive voltage PWR is applied and therefore the ribbon reflective members 10 displace and approach the common electrode substrate 12. When application of the drive voltage PWR to the ribbon reflective members 10 is stopped, the ribbon reflective members 10 return to their original horizontal locations. Accordingly, the ribbon reflective members 10 will be referred to as "moveable ribbon reflective members".

The ribbon reflective members and the common electrode substrate 12 have conductivity. Particularly, the moveable ribbon reflective members have flexibility for the displacement as described above. The common electrode substrate 12 is fixed. Of course, the ribbon reflective members have reflection characteristics for reflecting the incident light.

An example of typical dimensions of a ribbon reflective member will be explained next. For example, a width of each ribbon reflective member is 3 to 4 µm, a gap between adjacent ribbon reflective members is about 0.6 µm, and a length of the ribbon reflective member is about 200 to 400 µm.

A GLV element configured by a common electrode substrate 12 and a plurality of ribbon reflective members can be used to form one pixel by one such set of parts. For example, one pixel can be expressed by the six adjacent ribbon reflective members 10a, 11a, 10b, 11b, 10c, and 11c shown in FIG. 1. In this case, one pixel=s worth of width is 21 (3×6+0.6×5) µm to 27 (4×6+0.6×5) µm. When taking the average, one pixel=s worth of width is about 24 µm.

For example, in the currently being commercialized GLV elements for displaying 1080 pixels, a large 1080 pixels=worth of ribbon reflective members are arranged along the horizontal direction of FIG. 1. Such a GLV element array can be fabricated by microsemiconductor production technology.

The method of operation of a GLV element will be explained next.

(1) GLV Off State

If the common electrode substrate 12 is made the ground potential and the fixed ribbon reflective members 11 are also made the ground potential and the application of the drive voltage PWR to the moveable ribbon reflective members 10 is stopped to make them the ground potential, the planes of the moveable ribbon reflective members 10 and the fixed ribbon reflective members 11 become the same.

FIG. 2 is a sectional view of the horizontal direction of the GLV element 1 when making the moveable ribbon reflective members 10 the ground potential. This state will be referred to as the "off state" of the GLV element (inactive state or first state). In other words, in the off state of the GLV element, the moveable ribbon reflective members 10 and the fixed ribbon reflective members 11 are substantially located in the same plane across the above-mentioned gaps between planar ribbon reflective members. Namely, all ribbon reflective members maintain a certain distance from the substrate 12 and form almost the same reflection plane.

When the illumination light (incident light Li) is incident on the GLV element from above the ribbon reflective members in the off state illustrated in FIG. 2, it is reflected at the ribbon reflective members 10a, 11a, 10b, 11b, 10c, 11c, and 10d forming almost the same reflection plane and no optical path difference occurs in the reflected lights Lr. That is, all ribbon reflective members together function as a plane mirror which reflects incident illumination light (incident light Li) with almost no diffraction and polarization. The off state of a GLV element corresponds to a dark state of the screen when applying the GLV element to an image display device. The display surface becomes black.

(2) GLV on State

If making the common electrode substrate 12 the ground potential and also making the fixed ribbon reflective members 11 the ground potential and applying the drive voltage PWR to the moveable ribbon reflective members 10, electrostatic force acts between the common electrode substrate 12 and the moveable ribbon reflective members 10, the moveable ribbon reflective members 10 approach the common electrode substrate 12 (move downward), and therefore the moveable ribbon reflective members 10 approach the common electrode substrate 12 from the plane of the fixed ribbon reflective members 11. The moveable ribbon reflective members 10 have conductivity and flexibility enabling them to displace when the drive voltage PWR is applied in this way and to return when the application of the drive voltage PWR is stopped (GLV off state).

FIG. 3 is a sectional view of the horizontal direction of the GLV element 1 when applying a drive voltage PWR to the moveable ribbon reflective members 10. This state will be referred to as the "on state" of the GLV (active state or second state).

As shown in FIG. 3, the moveable ribbon reflective members 10 to which the drive voltage PWR is applied are pulled down to the substrate 12 by the electrostatic force and are separated from the plane of the fixed ribbon reflective members 11 by exactly a predetermined distance suitable for causing a diffraction phenomenon, for example, exactly $\lambda/4$. $\lambda$ is the wavelength of the incident light Li. As an example, when $\lambda=532$ nm, the amount of movement of the moveable ribbon reflective members becomes $\lambda/4=133$ nm.

When the illumination light Li is incident on the GLV element in the on state illustrated in FIG. 3, the total optical path difference between the light reflected at the moveable ribbon reflective members 10 and the light reflected at the fixed ribbon reflective members 11 becomes the half wavelength ($\lambda/2$) and a diffraction phenomenon occurs. Namely, the adjoining moveable ribbon reflective members and fixed ribbon reflective members form a cyclic structure diffracting the incident light Li. In the second state, the GLV element functions as a reflection type grating.

The reflected lights (0 order lights L0) interfere with and cancel out each other, while the ±1 order diffracted lights $L_{-1}$ and $L_{+1}$, ±2 order diffracted lights $L_{-2}$ and $L_{+2}$, and other order diffracted lights are produced.

For example, the ±1 order diffracted lights $L_{-1}$ and $L_{+1}$ pass through a not illustrated optical system in the image display device and are focused on the screen or other display surface of the image display device. The optical system of the image display device is configured so that the 0 order light L0 is blocked by for example a space filter etc. and does not reach the display surface of the image display device.

When parallel light L0 forming an incident angle $\theta i$ with respect to the plane of the ribbon reflective members is incident on the GLV element in the on state, a diffraction angle $\theta m$ of a generated m order diffracted light can be represented by the following equation 1:

$$\sin(\theta m) = \sin(\theta i) + (m \cdot \lambda/D) \quad (1)$$

where, D is a predetermined distance (lattice pitch) between the ribbon reflective members forming the same group of the GLV element shown in FIG. 3.

When the incident light Li is vertically incident upon the surface of the GLV element ($\theta i=0$), the order of the ±1 order diffracted light having the highest intensity becomes m=1, so the diffraction angle $\theta 1$ becomes as in the following equation 2:

$$\sin(\theta 1) = \lambda/D \quad (2)$$

When using a GLV element for an image display device, for example, at the time of display of black, the GLV element is used in the off state, while at the time of display of a color other than black, the GLV element is used in the on state. The display of the various colors when the GLV element is in the on state is determined by the light incident upon the GLV element.

In an image display device using a GLV element array functioning as such a one-dimensional image display device, in comparison with the usual two-dimensional image display device, for example, a projection type display device using a liquid crystal panel or the like, since there are no borders between pixels in the GLV element array itself, an extremely smooth and natural image can be expressed. Further, by using three primary color, that is, red, green, and blue lasers as the light sources and mixing these lights, it is possible to express images of an extremely broad and natural color reproduction range and obtain other superior aspects of display performance never before seen in the past. An image display device using a GLV element array is expected to realize a high contrast of for example 1000:1 or more.

For example, for a 1080×1920 pixel image display device, it is not easy in practice to realize a good image display for all of the 1080×1920 pixels obtained by making light strike the 1080 pixels=worth of GLV elements to generate the above diffracted light and scanning the diffracted light inside the image display device by a scanner. The reason is that due to imperfections in the production process etc., there is nonuniformity in the formation of the nanometer size ribbon reflective members and therefore there is some variation (fluctuation) in the ribbon reflective members of the 1080 pixels included in one GLV element array. As such variation, there are for example variation of the optical path length due to variation of the amount of movement of the plurality of moveable ribbon reflective members in the on state of a GLV element due to error (variation) of the drive voltage PWR for moving the ribbon reflective members at the nanometer level, occurrence of nonuniform planes of the ribbon reflective members in the off state due to variation of heights of the ribbon reflective members in the off state of the GLV element caused by the production technique and the other distortion, occurrence of scattering of light due to diffraction of the light outside of the effective illumination area, unevenness on the reflection surfaces of the ribbon reflective members and various deposits on the ribbon reflective members, and the influence of nonuniform secondary illumination light. These become factors deteriorating the image quality. These factors cause fluctuation particularly in brightness in the dark state (off state of GLV element).

Particularly, since the light is made incident upon the GLV element array comprised of the one-dimensional image display device to generate the diffracted light, and the diffracted light is scanned inside the image display device by a scanner to obtain a two-dimensional image, if there is variation in the image qualities of the pixels, pixels having a bad contrast will leave stripe like noise on the display surface by the scanning, so an image display device having a low image quality results.

Note that a GLV element functioning as a reflective member for reflecting all of the incident light in the first state and functioning as a grating for diffracting the incident light in the second state mentioned above will be referred to as a "light reflection and diffraction element" below.

DISCLOSURE OF THE INVENTION

An object of the present invention is to provide a light reflection and diffraction element not suffering from the above nonuniformity or variation.

Another object of the present invention is to provide a light reflection and diffraction element array configured by such light reflection and diffraction elements.

Still another object of the present invention is to provide an image display device using such a light reflection and diffraction element array.

According to a first aspect of the present invention, there is provided a light reflection and diffraction element for reflecting and/or diffracting incident light, the light reflection and diffraction element having a common electrode substrate, a first group of a plurality of reflective members located facing the common electrode substrate and having light reflection characteristics, and a second group of a plurality of reflective members located facing the common electrode substrate and having light reflection characteristics, wherein adjacent reflective members of the first group of a plurality of reflective members and adjacent reflective members of the second group of a plurality of reflective members are formed separated by a first cycle (pitch); corresponding members of the first group of a plurality of reflective members and the second group of a plurality of reflective members are located in a plane adjacent to each other in an inter digital form by a second cycle (pitch); a reflection plane of the first group of reflective members and a reflection plane of the second group of the reflective members become substantially the same reflection plane in a first state, while a reflection plane of the first group of reflective members and a reflection plane of the second group of reflective members are separated by exactly a distance for diffracting the incident light in a relationship between the first cycle and the second cycle in a second state; and the element has an unrequired diffracted light generation preventing means for preventing, when the incident light is incident, unrequired diffracted light from being generated from a portion other than an effective region wherein corresponding members of the first group of a plurality of reflective members and the second group of a plurality of reflective members are located adjacent to each other.

Preferably, the common electrode substrate has conductivity, the first group of reflective members have conductivity and elasticity and flexibility for displacing by exactly the distance and then returning, the second group of reflective members have conductivity, in the first state, the common electrode substrate and the first group of reflective members and the second group of reflective members are made the same potential, and in the second state, the common electrode substrate and the second group of reflective members are made the same potential and a second voltage for separating the first group of reflective members by exactly the distance is applied between the first group of reflective members and the common electrode substrate.

Further, preferably, the element has a first power feeder for feeding power at first ends of the first group of a plurality of reflective members and a second power feeder for feeding power at second ends of the second group of a plurality of reflective members, and the unrequired diffracted light generation preventing means has a light shielding mask for preventing the incident light from striking upon the first end and second end.

Preferably, each of the first group of reflective members has a first end, a second end facing the first end, and a first intermediate portion located between the first end and the second end; each of the second group of reflective members has a third end approaching the first end of a reflective member belonging to the first group, a fourth end facing the third end, and a second intermediate portion located between the third end and the fourth end; the element has a first common connecting portion for connecting the first ends of the first group of reflective members, a second common connecting portion for connecting the fourth ends of the second group of reflective members, a first power feeder for feeding power to the first common connecting portion and a second power feeder for feeding power to the second common connecting portion; and the unrequired diffracted light generation preventing means includes light shielding masks encompassing the first common connecting portion and the first ends and the second common connecting portion and the fourth ends and covering parts of the first and second intermediate portions exhibiting a cyclic structure for diffracting the incident light.

Further, preferably, the unrequited diffracted light generation preventing means includes a glass plate for protecting the first group of ribbon reflective members and the second group of ribbon reflective members and light shielding masks on the arranged protection glass, encompassing the first common connecting portion and the first ends and the second common connecting portion and the fourth ends, and covering portions corresponding to parts of the first and second intermediate portions exhibiting a cyclic structure for diffracting the incident light.

Further preferably, the reflection surfaces of the first group of reflective members and the second group of reflective members are formed with uneven surfaces having correlation lengths shorter than the predetermined cyclic structure.

According to a second aspect of the present invention, there is provided a light reflection and diffraction element for reflecting and/or diffracting incident light, the light reflection and diffraction element having a common electrode substrate, a first group of a plurality of reflective members located facing the common electrode substrate and having light reflection characteristics, a second group of a plurality of reflective members located facing the common electrode substrate and having light reflection characteristics, a first power feeder to the first group of a plurality of reflective members, and a second power feeder to the second group of a plurality of reflective members; wherein adjacent reflective members of the first group of a plurality of reflective members and adjacent reflective members of the second group of a plurality of reflective members are formed separated by a first cycle (pitch); corresponding members of the first group of a plurality of reflective members and the second group of a plurality of reflective members are located in a plane adjacent to each other in an inter digital form by a second cycle (pitch); a reflection plane of the first group of reflective members and a reflection plane of the second group of reflective members become substantially the same reflection plane in a first state, while a reflection plane of the first group of reflective members and a reflection plane of the second group of reflective members are separated by exactly a distance for diffracting the incident light in a relationship between the first cycle and the second cycle in a second state; and the first and second power feeders are buried so that they are not struck by the incident light when the incident light is incident.

According to a third aspect of the present invention, there is provided a light reflection and diffraction element array comprised of the light reflection and diffraction elements arrayed for a plurality of pixels.

According to a fourth aspect of the present invention, there is provided an image display device using the light reflection and diffraction element array. The image display device has a light source, a light reflection and diffraction element array for reflecting or diffracting the incident light from the light source in accordance with an image signal to be displayed, a space filter for transmitting or reflecting the diffracted light from the light reflection and diffraction element array, and a scanning means for scanning the light from the space filter and converting it to a two-dimensional image.

BEST MODE FOR WORKING THE INVENTION

Preferred embodiments of a light reflection and diffraction element using a grating light valve (GLV) device (GLV element), a light reflection and diffraction element array using the light reflection and diffraction element, and an image display device using the light reflection and diffraction element array will be explained next with reference to the attached drawings.

First Embodiment

A first embodiment of the present invention will be explained by referring to FIG. 4 to FIG. 9.

As the first embodiment, a light reflection and diffraction element not influenced by unintended diffracted light, a light reflection and diffraction element array, and an image display device using the light reflection and diffraction element array will be explained.

In the present specification, a "light reflection and diffraction element" means an element exhibiting a basic structure for one pixel using a GLV element, while a "light reflection and diffraction element array" means a structure of light reflection and diffraction elements for a plurality of pixels. A light reflection and diffraction element array is used when used for an image display device.

Figure 4:
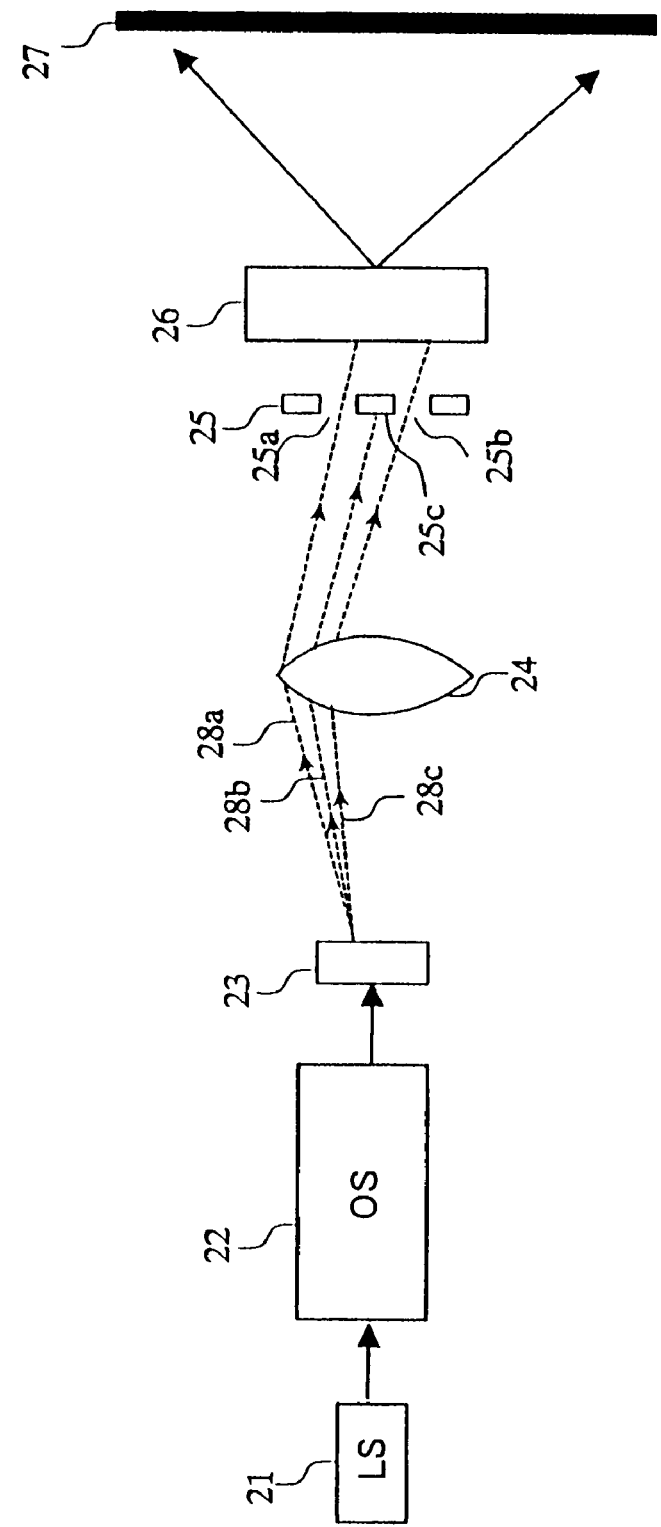
FIG. 4 is a schematic view of the configuration of an image display device according to a first embodiment of the present invention.

FIG. 4 is a schematic view of the configuration of an image display device according to the first embodiment.

An image display device 20 shown in FIG. 4 has a light source 21, an illumination optical system 22, an array of light reflection and diffraction elements 23 using a one-dimensional GLV element array as a one-dimensional image element array, a focus lens 24, a space filter 25, a scan mirror 26 as the scanning means of the present invention, and a screen 27.

The light source 21 is for example a light emitting device of semiconductor laser etc. and includes three types of light sources for emitting red, green, and blue light.

The illumination optical system 22 converts the light from the light source 21 to parallel light and emits the same to the one-dimensional array of light reflection and diffraction elements 23.

Light Reflection and Diffraction Element

Figure 1:
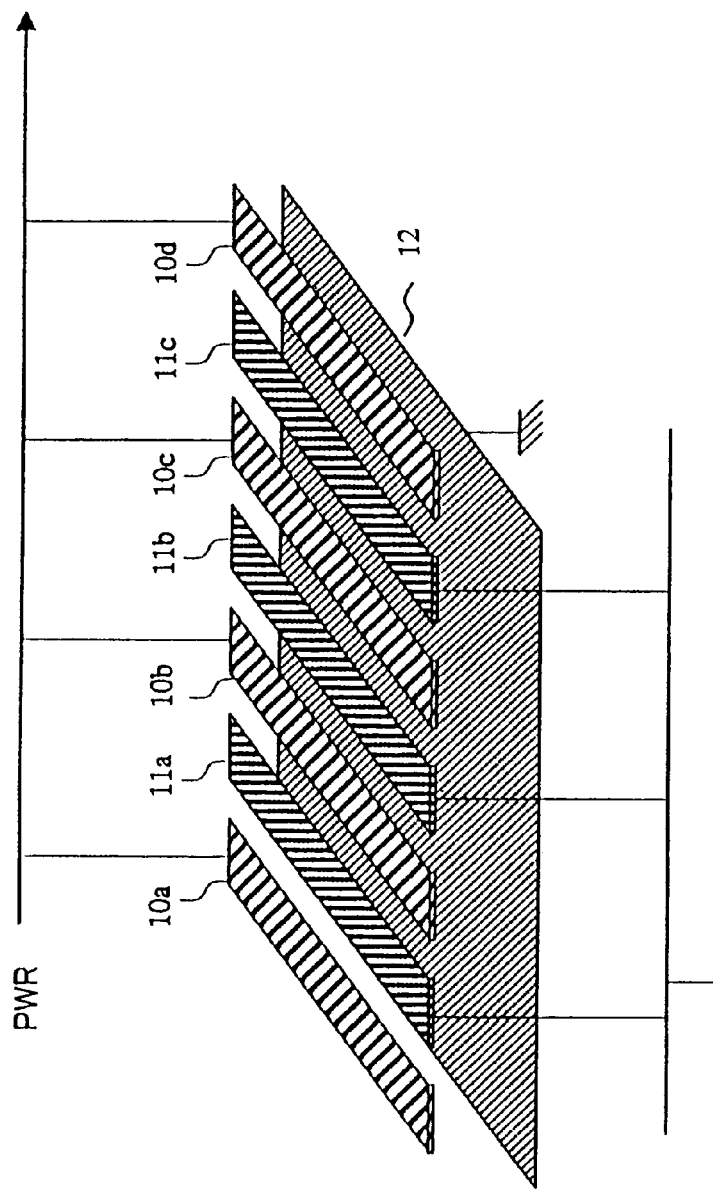
FIG. 1 is a perspective view of the configuration of a GLV element.
Figure 2:
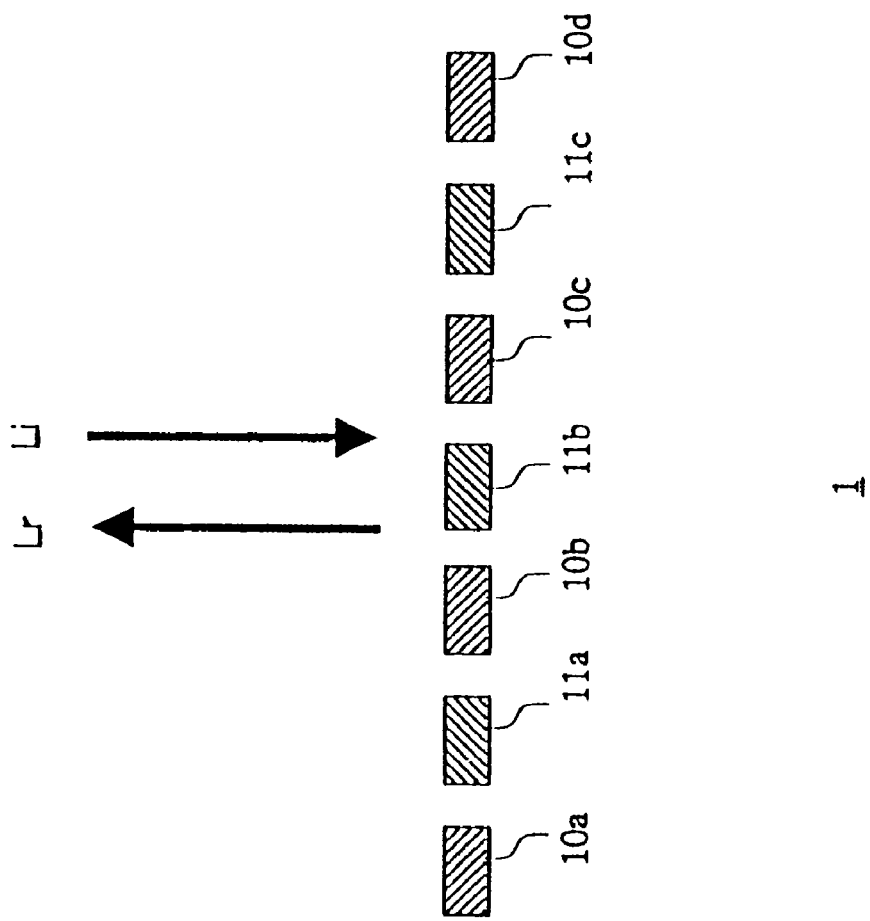
FIG. 2 is a sectional view of ribbon reflective members showing an off state of the GLV element.

A light reflection and diffraction element 23 is an element using a GLV element constituted by, as illustrated in FIG. 1, a common electrode substrate 12 and a plurality of ribbon reflective members located separated by a predetermined interval from the common electrode substrate 12.

Figure 6:
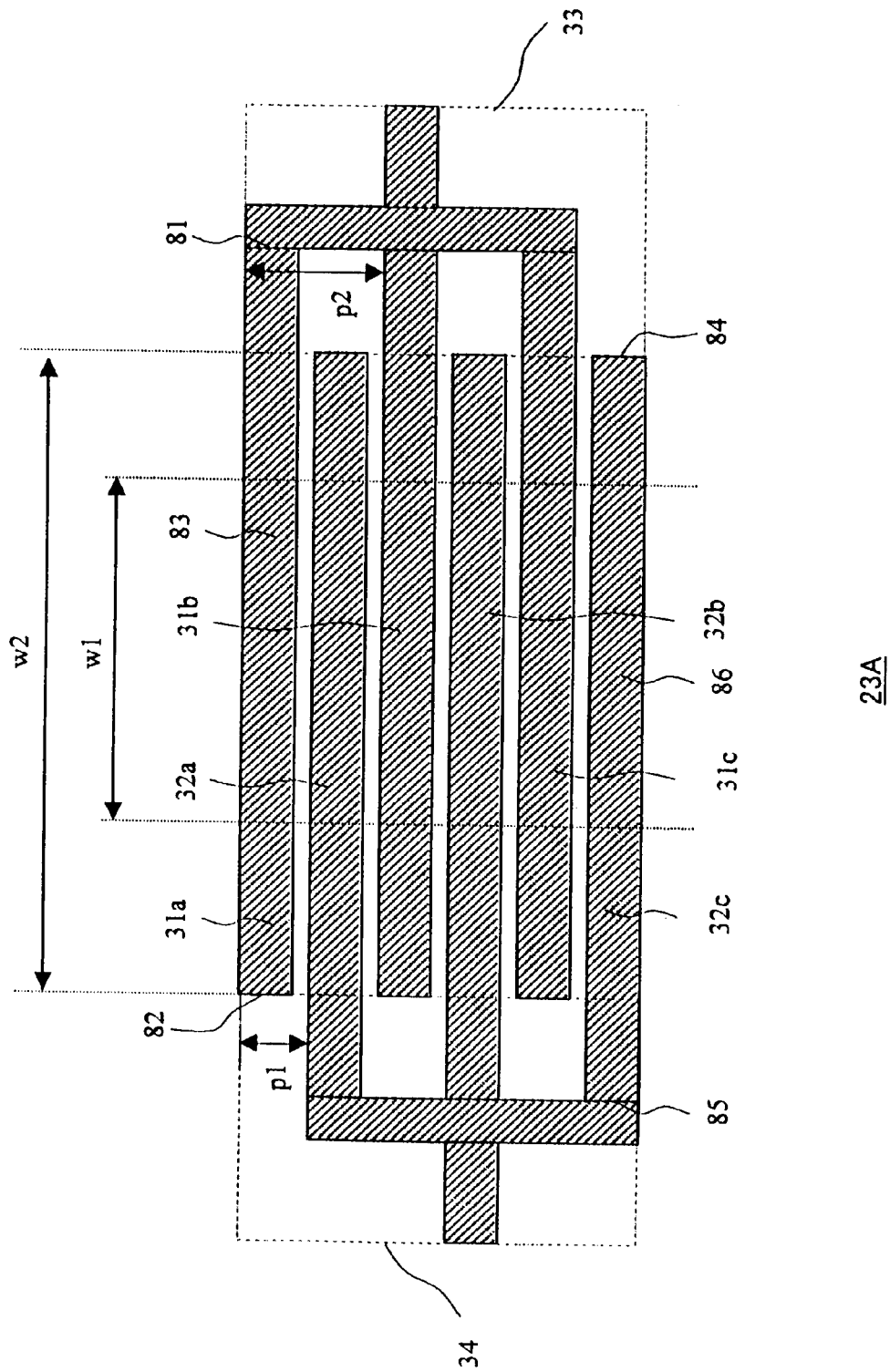
FIG. 6 is a view of a plane structure of the ribbon reflective members of a light reflection and diffraction element used in the image display device illustrated in FIG. 4 as an example.

The plurality of ribbon reflective members of the light reflection and diffraction element 23 are one-dimensionally aligned. As illustrated in FIG. 6, it is comprised of two groups of the moveable ribbon reflective members 31$a$, 31$b$, and 31$c$ (indicated together as "31") and the fixed ribbon reflective members 32$a$, 32$b$, and 32$c$ (indicated together as "32").

As the first state, the common electrode substrate 12, the fixed ribbon reflective members 32, and the moveable ribbon reflective members 31 are made the same potential. Namely, the same voltage is given to the common electrode substrate 12, the fixed ribbon reflective members 32, and the moveable ribbon reflective members 31 so as for example to make them the ground potential. In this state, there is no voltage difference between the common electrode substrate 12 and the fixed ribbon reflective members 32, therefore no electrostatic force occurs, and the fixed ribbon reflective members 32 are not attracted by the common electrode substrate 12. Similarly, there is no voltage difference between the common electrode substrate 12 and the moveable ribbon reflective members 31, so no electrostatic force occurs and the moveable ribbon reflective members 31 are not attracted by the common electrode substrate 12. Accordingly, the fixed ribbon reflective members 32 and the moveable ribbon reflective members 31 form the same reflection plane, reflect all incident light Li, do not give any optical path difference to the reflected light, and do not generate diffracted light. This first state will be also referred to as the "off state" (inactive state) of a light reflection and diffraction element 23.

Figure 3:
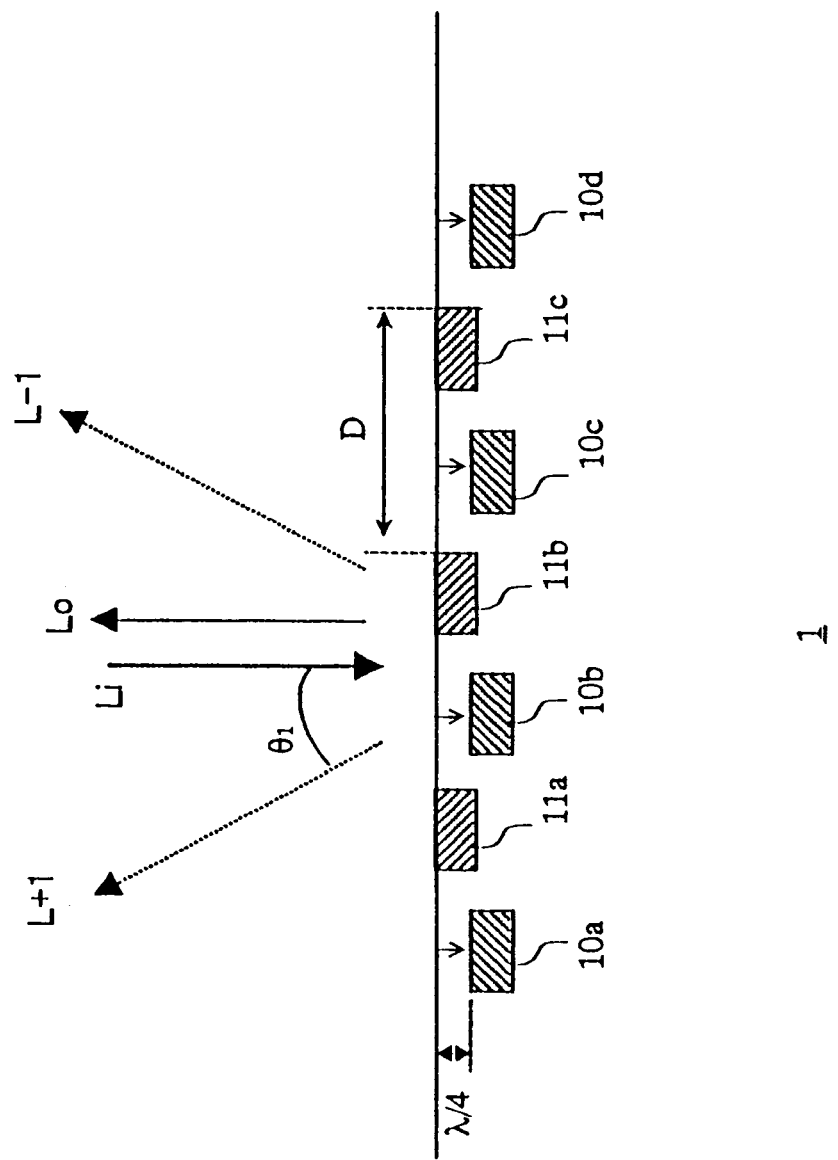
FIG. 3 is a sectional view of ribbon reflective members showing an on state of the GLV element.

As the second state, the common electrode substrate 12 and the fixed ribbon reflective members 32 are made the same potential. Namely, the same voltage is given to the common electrode substrate 12 and the fixed ribbon reflective members 32 to, for example, make them the ground potential. On the other hand, a drive voltage PWR for causing a voltage difference between the moveable ribbon reflective members 31 and the common electrode substrate 12 is applied to the moveable ribbon reflective members 31. In this state, there is no voltage difference between the common electrode substrate 12 and the fixed ribbon reflective members 32, therefore the fixed ribbon reflective members 32 are not attracted by the common electrode substrate 12. However, an electrostatic force acts due to the voltage difference between the common electrode substrate 12 and the moveable ribbon reflective members 31, so the moveable ribbon reflective members 31 having flexibility are attracted by the common electrode substrate 12 and are displaced. As a result, as illustrated in FIG. 3, the moveable ribbon reflective members 31 move (are displaced) to the common electrode substrate 12 side from the plane of the fixed ribbon reflective members. The plane of the moveable ribbon reflective members 31 is separated from the fixed ribbon reflective members 32 by exactly a predetermined distance corresponding to an optical path difference suitable for causing a desired diffraction phenomenon, for example λ/4 (λ is the wavelength of the incident light Li). Accordingly, the optical path difference occurs in the reflected light obtained by the reflection of the illumination light Li incident upon the light reflection and diffraction element 23, and diffraction occurs. Due to this diffraction action, diffracted lights 28a and 28c such as the 0 order light, the ±1 order diffracted light, and the ±2 order diffracted light are emitted from the light reflection and diffraction element 23. The ±1 order diffracted light and the ±2 order diffracted light are advanced in directions different from the 0 order light 28b. This second state will be referred to as the "on state" (active state) of a light reflection and diffraction element 23.

In this way, a light reflection and diffraction element 23 using a GLV element functions as a light reflection element, while functions also as a light grating.

Note that, when displaying black, the light reflection and diffraction element 23 is used in the off state, while when displaying a color other than black, the light reflection and diffraction element 23 is used in the on state. When displaying various colors at the time of displaying color, for example, in the illumination optical system 22, an incident light Li of a color in accordance with the color to be displayed on the screen 27 is generated and made incident upon the light reflection and diffraction element 23.

Convex Lens, Scan Mirror, and Space Filter

A focus lens (convex lens) 24 located in front of the array of light reflection and diffraction elements 23 magnifies the one-dimensional image formed by the reflected light 28b emitted from the array of light reflection and diffraction elements 23 or the diffracted lights 28a and 28c and projects the same via the space filter 25 onto the scan mirror 26 serving as a scanning means.

The 0 order light 28b and the ±1 order lights 28a and 28c generated at the array of light reflection and diffraction elements 23 when the array of light reflection and diffraction elements 23 are in the on state (second operation state) strike the space filter 25 via the focus lens 24.

Figure 5:
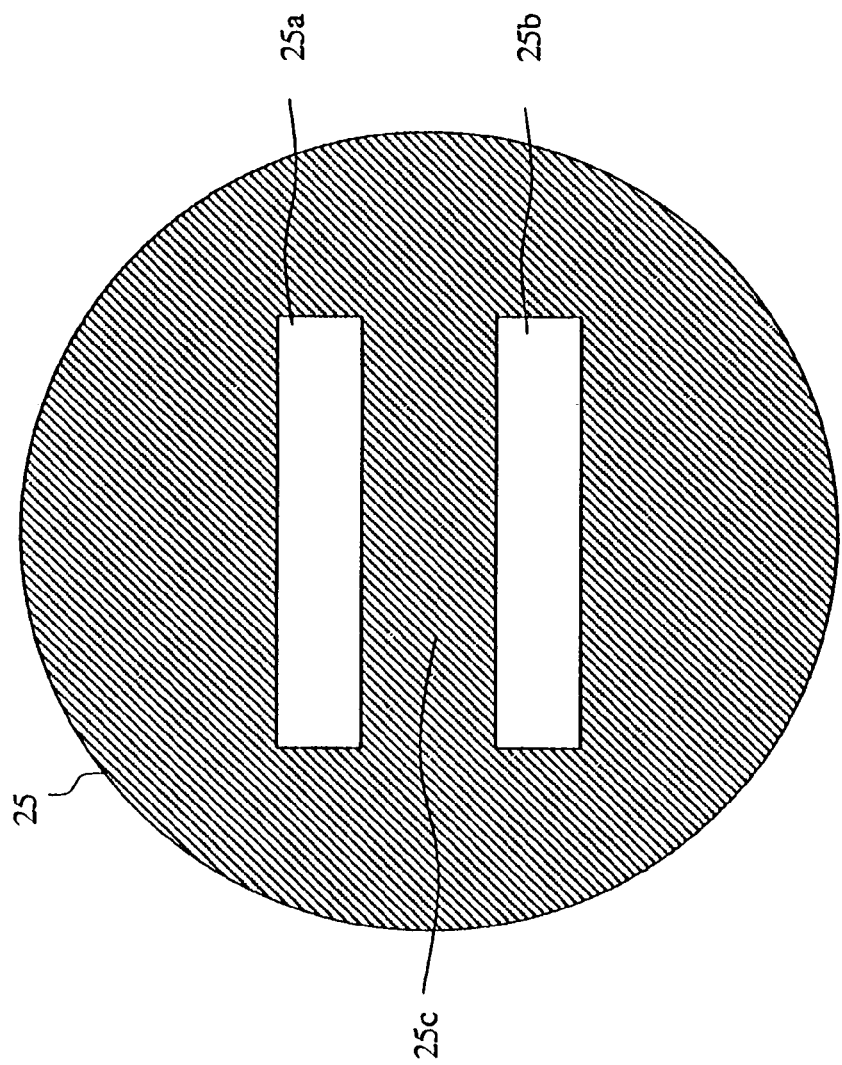
FIG. 5 is a front view of a space filter of a first example illustrated in FIG. 4.

The space filter 25 located in front of the focus lens 24 passes the ±1 order diffracted lights 28a and 28c emitted from the focus lens 24 through the light transmission portions 25a and 25b to reach the scan mirror 26, one example of which is illustrated in FIG. 5. Further, the space filter 25 reflects the reflected light or the 0 order light 28b emitted from the lens 24 and arriving along the optical axis of the array of light reflection and diffraction elements 23 and the optical axis of the space filter 25 at a reflection portion 25c at the center coincident with an optical axis of other than the light transmission portion 25a and at a reflection portion 25c on the periphery of the light transmission portion 25a and therefore does not pass the same through the space filter 25. Details of the space filter 25 will be explained later by referring to FIG. 5.

The scan mirror 26 located in front of the space filter 25 scans the reflected and diffracted light including the one-dimensional image information from the array of light reflection and diffraction elements 23 arriving via the space filter 25 and reflects it onto the screen 27 to forms a two-dimensional image on the screen 27. The scan mirror 26 is for example a galvanomirror.

Space Filter

FIG. 5 is a front view of the space filter 25 illustrated in FIG. 4.

The space filter 25 has light transmission portions (openings) 25a and 25b and a reflection portion (light shielding portion) 25c.

When a light reflection and diffraction element 23 is in the first (off) state, the illumination light (incident light Li) incident upon the light reflection and diffraction element 23 is reflected and the reflected light is emitted from the light reflection and diffraction element 23. The reflected light advances in a direction determined depending upon the incident angle of the incident light Li, is reflected by the reflection portion 25c in the space filter 25, and does not reach the scan mirror 26 and the screen 27. Accordingly, at this time, black is displayed on the screen of the image display device. This state will be referred to as a "dark state" of the image display.

When a light reflection and diffraction element 23 is in the first (on) state, the illumination light (incident light Li) incident on the light reflection and diffraction element 23 is diffracted, and the diffracted light such as the 0 order light and the ±1 order light is emitted. The intensity of the 0 order light due to the diffraction phenomenon becomes lower than the intensity of the reflected light when the light reflection and diffraction element 23 is in the off state, so the intensity of the diffracted light such as the ±1 order diffracted light becomes high.

The diffracted light of each order (m) is diffracted in an angular direction determined by the wavelength λ of the illumination light (incident light Li) and the pitch D of the ribbon reflective members of the light reflection and diffraction element 23. The diffracted light lights such as the 0 order light and the ±1 order diffracted light advance in different directions and strike the reflection portion 25c and the light transmission portions 25a and 25b of the space filter 25.

The diffracted light from the light reflection and diffraction element 23 includes not only the 0 order light and the ±1 order diffracted light, but also the diffracted light of a high order of the ±2 order or more.

In order to obtain the largest contrast on the screen 27 of the image display device, the locations and dimensions of the light transmission portions 25a and 25b and the reflection portion 25c of the space filter 25 are designed so that the ±1 order diffracted light generated most efficiently when the light reflection and diffraction element 23 is in the on state can pass through the space filter 25 with almost no loss (no attenuation), and the diffracted light such as the 0 order light and the 2 order light are sufficiently interrupted.

When obtaining a brighter image in the image display device, it is also possible if these high order diffracted lights of the 2 order or more are made incident upon the transmission portions 25a and 25b of the space filter 25 together with the ±1 order diffracted light. The space filter 25 can be configured to be suited to such conditions.

Ribbon Reflective Members

FIG. 6 shows the partial plane structure of the ribbon reflective members constituting a light reflection and diffraction element 23 used in the image display device 20 illustrated in FIG. 4.

As shown in FIG. 6, the plurality of ribbon reflective members 23A arranged along one dimension to form a light reflection and diffraction element 23 together with the common electrode substrate 12 includes six ribbon reflective members parallel to each other, that is, the ribbon reflective members 31a, 32a, 31b, 32b, 31c, and 32c. These ribbon reflective members define one pixel.

The plurality of ribbon reflective members 23A are grouped into two groups of a first group of the ribbon reflective members 31a, 31b, and 31c and a second group of the ribbon reflective members 32a, 32b, and 32c. These ribbon reflective members are connected to a not illustrated wire bonding pad for feeding power.

One pixel=s worth of an image is formed by the plurality of ribbon reflective members 23A illustrated in FIG. 6 and the common electrode substrate 12 illustrated in FIG. 1. The light reflection and diffraction element array used as the array of light reflection and diffraction elements 23 in FIG. 4 is formed by the common electrode substrate 12 and a plurality of pixels=worth of the ribbon reflective members 23A illustrated in FIG. 6, for example, 1080 pixels=worth, arranged in an array facing the common electrode substrate 12. As the array of light reflection and diffraction elements 23 used in the image display device 20 of FIG. 4, use is made of this light reflection and diffraction element array.

The ribbon reflective members are supplied with voltage, so the ribbon reflective members have conductivity. The ribbon reflective members have flexibility for displacement due to the electrostatic force and elasticity for return after displacement. Particularly, the moveable ribbon reflective members 31 undergo displacement and return repeatedly at a high speed a very large number of times, so desirably are constituted as thin films having durability and elasticity.

The ribbon reflective members from which such characteristics are required have structures of silicon nitride (SiN) films formed on their surfaces with aluminum film serving as reflection surfaces.

When the drive voltage PWR is applied to the first group of ribbon reflective members (31a, 31b, 31c) among the ribbon reflective members, the moveable ribbon reflective members 31 move toward the common electrode substrate 12 side due to the electrostatic force derived from the potential difference between the moveable ribbon reflective members 31 and the common electrode substrate 12 (FIG. 1). Accordingly, the ribbon reflective members 31 will be referred to as the "moveable ribbon reflective members". The second group of ribbon reflective members 32 (32a, 32b, 32c) are made the same potential as that of the common electrode substrate 12 and do not displace, but are fixed, so will be referred to as the "fixed ribbon reflective members".

Note that if the application of the drive voltage PWR is reversed, it is also possible to use the fixed ribbon reflective members 32 as the moveable ribbon reflective members and use the moveable ribbon reflective members 31 as the fixed ribbon reflective members.

The groups of ribbon reflective members are cyclically arranged at a predetermined pitch.

The moveable ribbon reflective members 31a, 31b, and 31c are formed by first ends 81, second ends 82 facing the first ends 81, and first intermediate portions 83 having reflection surfaces formed on one sides and connecting the first ends 81 and the second ends 82.

The fixed ribbon reflective members 32a, 32b, and 32c are formed by third ends 84 approaching the first ends 81, fourth ends 85 facing the third ends 84, and second intermediate portions 86 having reflection surfaces formed on one sides and connecting the third ends 84 and the fourth ends 85.

The moveable ribbon reflective members 31a, 31b, and 31c are electrically connected to the first common connecting portion at their first ends 81, The overall planar shape of the moveable ribbon reflective members is a "comb" shape. The fixed ribbon reflective members 32a, 32b, and 32c are electrically connected to the second connecting portion at their fourth ends 85. The overall planar shape of the fixed ribbon reflective members is also a "comb" shape. The ends and the intermediate portions of the moveable ribbon reflective members and the ends and the intermediate portions of the fixed ribbon reflective members are inserted among each other to obtain an inter digital form. Namely, the ribbon reflective members 23A ate comprised of the two groups of comb-shaped ribbon reflective members arrayed in an inter digital form.

The reflection surfaces (first reflection plane) of the moveable ribbon reflective members 31a, 31b, and 31c belonging to the first group when the drive voltage PWR is not applied (first state) and the reflection surfaces (second reflection plane) of the fixed ribbon reflective members 32a, 32b, and 32c belonging to the second group are in substantially the same plane.

Supports (not illustrated) for supporting the comb structures of the ribbon reflective members 31a, 32a, 31b, 32b, 31c, and 32c while holding a certain interval from the common electrode 12 shown in FIG. 1 facing the other surfaces of the ribbon reflective members 31a, 32a, 31b, 32b, 31c, and 32c and located at predetermined interval from them are formed at least at one position at both ends of the portions of the length w2 in the ribbon reflective members 31a, 32a, 31b, 32b, 31c, and 32c.

The portions of the length w2 indicate portions between the ends of the first group of moveable ribbon reflective members 31 and the ends of the second group of fixed ribbon reflective members 32 and are portions where an optical path difference (step) causing the diffraction phenomenon can substantially be produced between the first reflection plane of the moveable ribbon reflective members 31 and the second reflection plane of the fixed ribbon reflective members 32. Namely, the portions of the length w2 are portions able to cause a legitimate diffraction phenomenon.

When the drive voltage PWR causing the potential difference between the common electrode 12 and the moveable ribbon reflective members 31 is not applied to the moveable ribbon reflective members 31, the surfaces of the moveable ribbon reflective members 31 and the surfaces of the fixed ribbon reflective members 32 form substantially the same reflection plane. In the plane structure, the ribbon reflective members are arranged at a cycle (pitch) p1.

The cycle (pitch) p1 indicates the cycle in the structure of the light reflection and diffraction element 23 when the light reflection and diffraction element 23 is in the off state. The length (width) w2 indicates the effective lengths of the ribbon reflective members causing the diffraction phenomenon in the region forming the cycle (pitch) p1 in the structure. The effective length means the length of the portions able to substantially cause a legitimate diffraction phenomenon.

When holding the common electrode substrate 12 at the ground potential, making the potentials of the fixed ribbon reflective members 32 the same as the common electrode substrate 12, and applying a drive voltage PWR to the moveable ribbon reflective members 31s to cause a potential difference corresponding to the drive voltage PWR between the common electrode substrate 12 and the moveable ribbon reflective members 31, an electrostatic force corresponding to this potential difference causes the moveable ribbon reflective members 31 to flex (fluctuate) by exactly a distance whereby the diffraction phenomenon occurs at the common electrode substrate 12 side starting from the not illustrated supports. Namely, the reflection surfaces of the moveable ribbon reflective members 31 approach the common electrode substrate 12 side by exactly a distance corresponding to the optical path difference causing the diffraction phenomenon from the reflection surfaces of the fixed ribbon reflective members 32. As a result, when the incident light Li is illuminated from above the sheet surface of FIG. 6 to the ribbon reflective members 23A constituting the light reflection and diffraction element 23, the light reflection and diffraction element 23 functions as a reflection type grating having a cyclic structure of the cycle (pitch) p2 for diffracting the incident light Li.

The diffracted light generated at the light reflection and diffraction element 23 functioning as the reflection type grating is split at the space filter 25 shown in FIG. 1. In this way, the light reflection and diffraction element 23 operates as a grating having an optical switching function.

As the space filter 25, there are two types: a first type for allowing passage of the diffracted light generated from a light reflection and diffraction element 23 functioning as a reflection type grating when the drive voltage PWR is applied to the moveable ribbon reflective members 31 and a second type for allowing the passage of the reflection light (O order light) L0 generated from a light reflection and diffraction element 23 when the drive voltage PWR is not applied to the moveable ribbon reflective members 31.

The space filter 25 in the first embodiment illustrated in FIG. 5 is set to a location and dimensions that pass the primary diffracted light generated most efficiently when applying the drive voltage PWR to the moveable ribbon reflective members 31 at the light transmission portions 25a and 25b without loss and sufficiently block the diffracted light such as the 0 order light and the secondary light at the reflection portion 25c and is structured so that the maximum contrast is obtained in an image display device.

However, this alone cannot realize a contrast of 1000:1 or more over all pixels.

In the inter digital (comb) structure where the adjacent ribbon reflective members 31a, 32a, 31b, 32b, 31c, and 32c are inserted with each other, the drive voltage PWR is applied to the moveable ribbon reflective members 31 and the fixed ribbon reflective members 32 are held at the same ground potential as that of the common electrode substrate 12, so connection regions 33 and 34 connected to the first and second common connecting portions at the first ends 81 and the fourth ends 85 and indicated by broken lines are formed. The first connection region 33 is located at the region to the right side of the portions of the length w2 (effective portions) of the moveable ribbon reflective members 31, while the second connection region 34 is located at the region to the left side of the portions of the length w2 of the fixed ribbon reflective members 32.

The portions inside the connection regions 33 and 34, that is, the portions of the length w2 (effective portions), exhibit cyclic structures by the ribbon reflective members belonging to the same group. The cycle (interval or pitch) of them on the structure is p2. In other words, the ribbon reflective members belonging to the same group are cyclically formed at intervals p2.

The ribbon reflective members belonging to the same group forming the cyclic structure p2 in the connection regions 33 and 34 form a grating for diffracting the incident light and generating the diffracted light when there is a suitable distance from a not illustrated lower layer member of the GLV element, for example, a whole multiple of $\lambda/4$ ($\lambda$ is the wavelength of the incident light Li).

Note that, even with a distance shorter than an accurate distance of a whole multiple of $\lambda/4$ as described above, there is a possibility of forming a grating. For this reason, when illumination light (incident light Li) strikes the connection regions 33 and 34, irrespective of whether or not the drive voltage PWR is applied to the moveable ribbon reflective members 31, that is irrespective of the on state or the off state of the light reflection and diffraction element 23, there is a possibility that the illumination light will be partially diffracted and that unintended diffracted light will be generated.

According to equation 1, a diffraction angle $\theta m$ of the m order diffracted light is determined by the incident angle $\theta i$ of the incident light, the lattice pitch D of the grating, and the wavelength $\lambda$ of the illumination light, therefore when the incident light Li is vertically incident upon the reflection surfaces of the ribbon reflective members 23A, the diffraction angle of the diffracted light from the connection regions 33 and 34 is defined by the pitch p2.

In the ribbon reflective members 23A shown in FIG. 6, the cycle (pitch) of the grating formed in the on state when the drive voltage PWR is applied to the moveable ribbon reflective members 31 is p2. The diffraction angle of the generated diffracted light is defined by this pitch p2. The locations and the dimensions of the light transmission portions 25a and 25b and the reflection portion 25c of the space filter 25 are also defined by the pitch p2, the order m, the incident angle $\theta i$, and the wavelength $\lambda$ of the illumination light (incident light Li).

The illumination light (incident light Li) at the light reflection and diffraction element 23 is parallel light. The incident angle θi is constant. Accordingly, in FIG. 6, when the illumination light is illuminated to the region of the length w2 (effective portions) and, at the same time, illuminated also to the connection regions 33 and 34, even if the light reflection and diffraction element 23 is in the off state, unintended diffracted light is generated at the connection regions 33 and 34 and emitted in the same direction as the diffracted light generated in the region of the length w2, that is, toward the focus lens 24 and the space filter 25. For example, unintended ±1 order diffracted light from the connection regions 33 and 34 passes through the light transmission portions 25a and 25b of the space filter 25. Due to this, even when the light reflection and diffraction element 23 is in the off state, that is, a case where the image display on the screen 27 is in the dark state (state of display of black color), the ±1 order diffracted light from the connection regions 33 and 34 passes through the light transmission portions 25a and 25b of the space filter 25 and reaches the screen 27. As a result, even in the dark state, a bright image is formed on the screen 27, and the contrast is lowered.

In order to avoid generation of the unintended diffracted light at the connection regions 33 and 34 by the illumination light, a method, for example, of limiting the length of the illumination region in the length direction of the ribbon reflective members 31a, 32a, 31b, 32b, 31c, and 32c and not illuminating the connection regions 33 and 34 can be considered. For example, as shown in FIG. 6, the illumination region for illumination by the incident light Li is made the portions of the ribbon reflective members having the length w1 shorter than the length w2 to thereby prevent the incident light Li from striking upon the connection regions having the cycles in the structure of p2. However, if considering the condition that the length w1 of the illumination region is made shorter than the length w2 of the ribbon reflective members in this way, this can be satisfied 100% by direct illumination light from the light source 21, but in an actual image display device, there is a certain amount of secondary illumination light due to the reflected light and the scattered light from a not illustrated projection lens and other not illustrated optical parts, so it is difficult to make the incident light Li of the secondary illumination light resulting from this strike only the portions of the length w1. Further, the ribbon reflective members are very short in length. For example, w2 is 300 to 400 μm, and w1 is about 30 μm. It is also difficult to precisely control the illumination region of the light in such a tiny region.

For example, when the illumination light of 0.2% to 1% of the direct primary illumination light from the light source 21 strikes the connection regions 33 and 34 having the cycle p2 in structure as the secondary illumination light due to the reflected light and the scattered light from not illustrated other optical parts in the image display device (hereinafter referred to as the "secondary illumination light"), the secondary illumination light is diffracted in the connection regions 33 and 34. A considerable part of the secondary illumination light is emitted as the diffracted light, passes through the space filter 25, and is focused onto the screen 27 of the image display device. Due to this, the contrast of the portion corresponding to that pixel of the image is lowered to 500:1 to 100:1.

Further, this secondary illumination light is generally nonuniform in terms of space. It causes nonuniform stripe-like noise on the display surface on the screen 27, so the image quality drops sharply.

In the first embodiment, light shielding masks covering the connection regions 33 and 34 having the cycle p2 in the structure and preventing unintended diffracted light from being generated are provided so as to avoid occurrence of diffraction at the connection regions 33 and 34.

Figure 7:
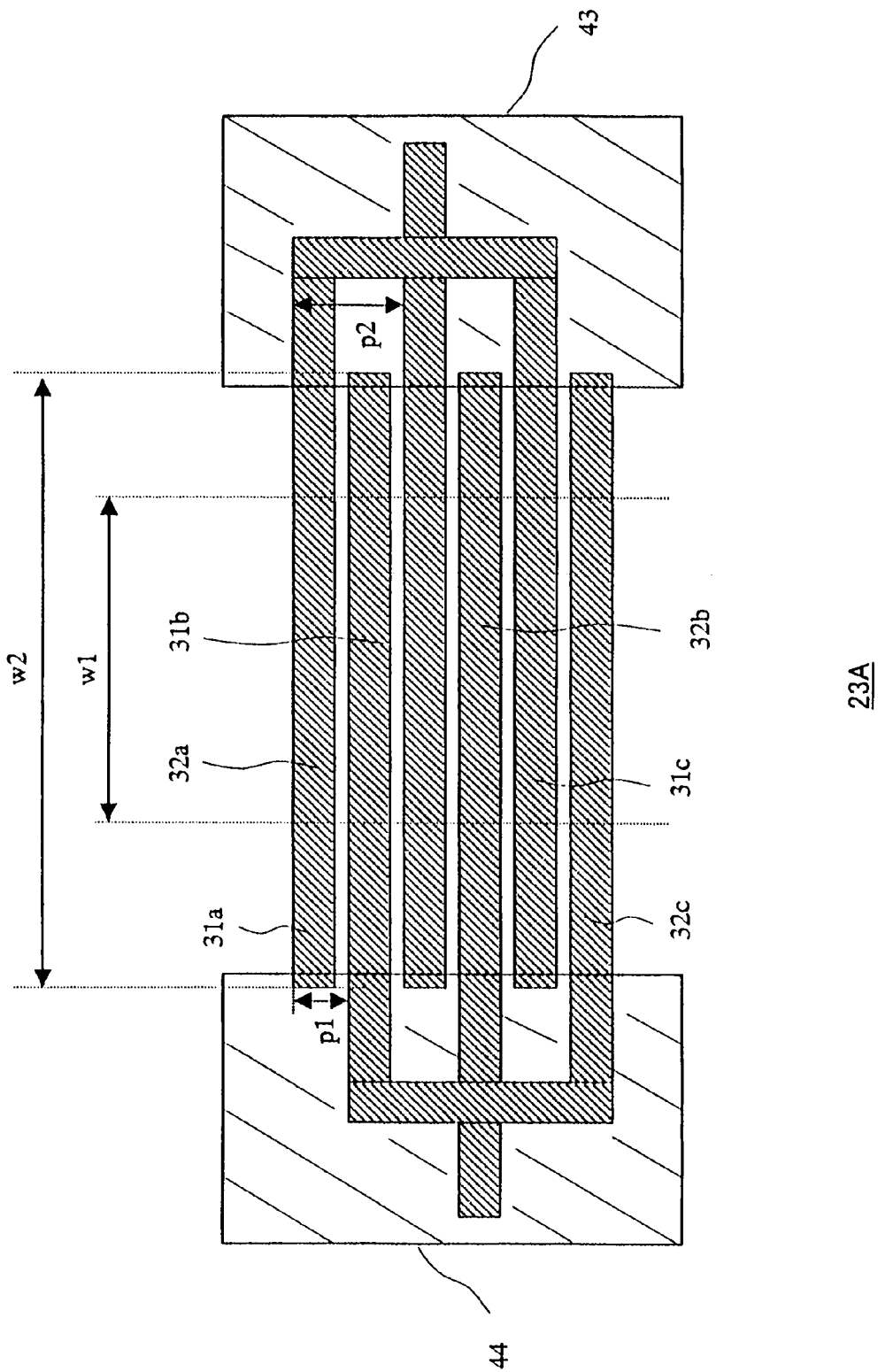
FIG. 7 is a view of a plane structure of a light reflection and diffraction element wherein connection regions of the light reflection and diffraction element illustrated in FIG. 6 are covered by light shielding masks.

FIG. 7 is a view of the plane structure of a light reflection and diffraction element 23 wherein the connection regions 33 and 34 of the ribbon reflective members 23A are covered by light shielding masks 43 and 44.

Since the connection regions 33 and 34 are covered by the light shielding masks 43 and 44, even if the illumination light strikes the connection regions 33 and 34, no diffracted light is produced there.

It is also possible that the light shielding masks 43 and 44 be directly formed on the surfaces of the ribbon reflective members 23A. If they cannot be formed directly on the surfaces of the ribbon reflective members 23A or if the formation is difficult, it is also possible that for example a glass plate protecting the ribbon reflective members 23A be arranged at a close location above the ribbon reflective members 23A and that the light shielding masks 43 and 44 be formed on this glass plate.

A method of production of the light shielding masks 43 and 44 will be explained next.

Figure 8:
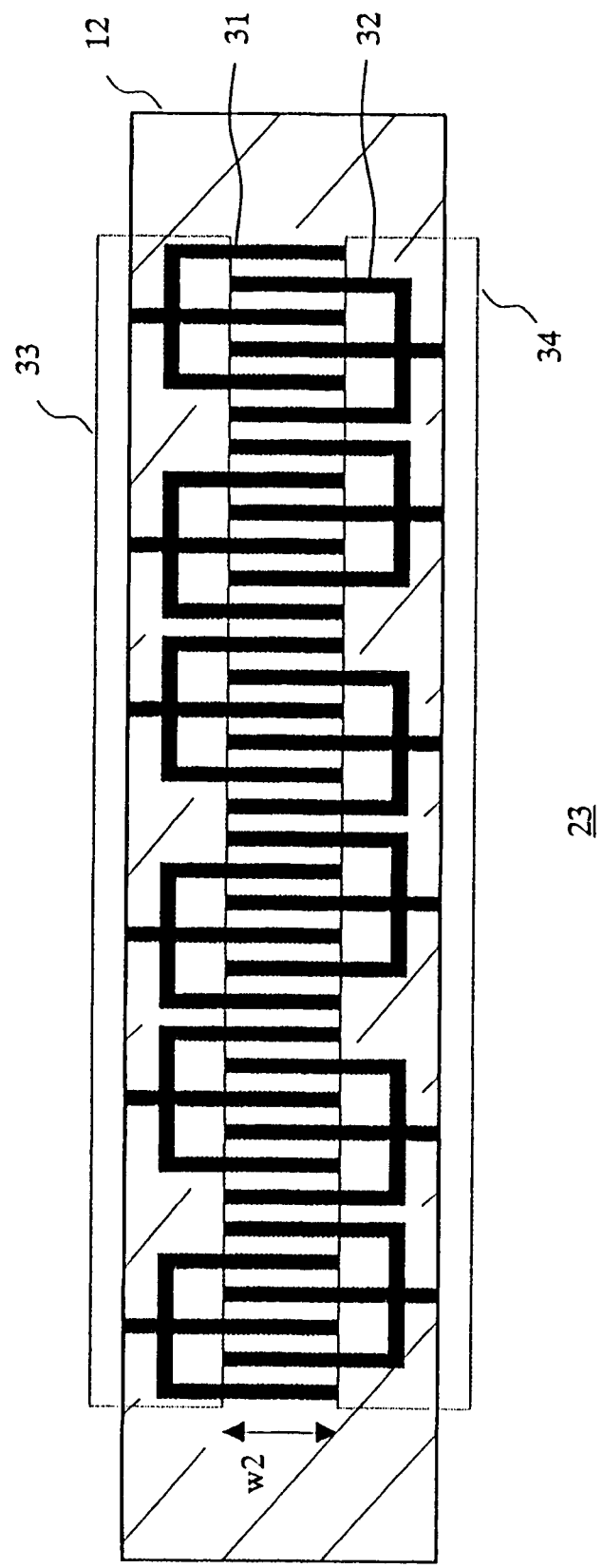
FIG. 8 is a plan view of a light reflection and diffraction element array not formed with light shielding masks covering the connection regions.
Figure 9:
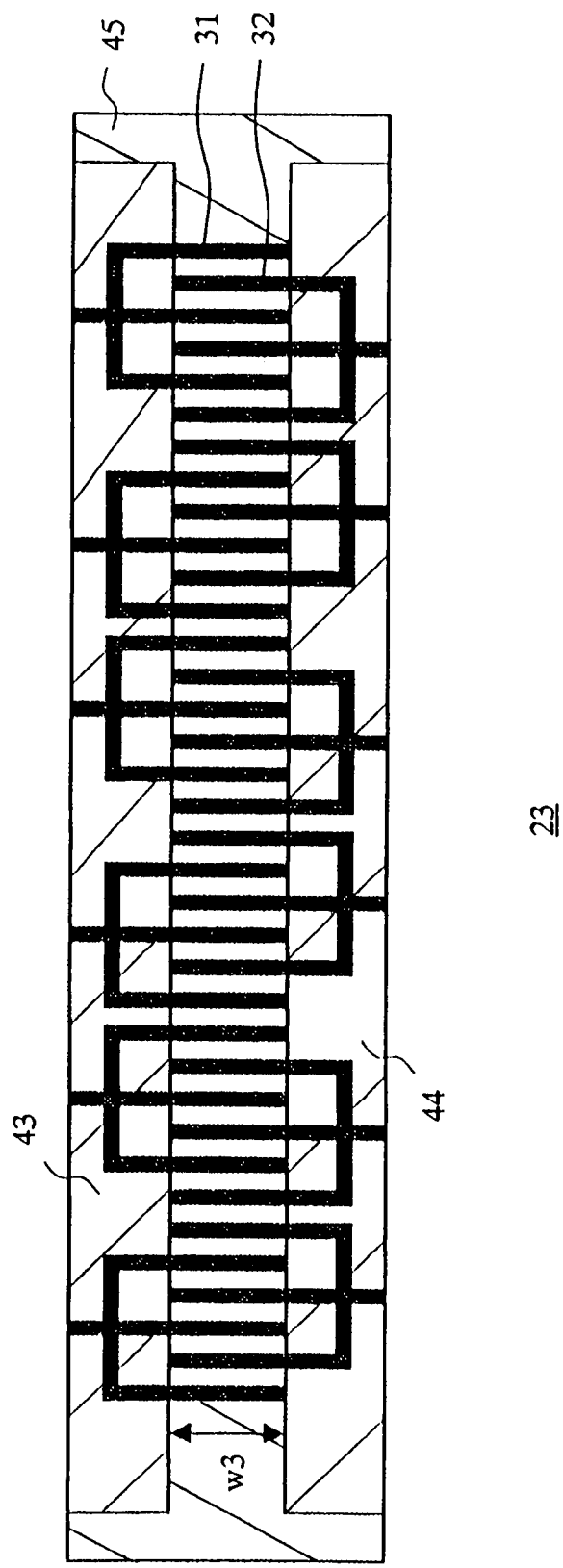
FIG. 9 is a plan view of a light reflection and diffraction element array formed with light shielding masks covering the connection regions.

FIG. 8 and FIG. 9 are views of the plane structure of a light reflection and diffraction element array having a plurality of pixels=worth of the ribbon reflective members provided with the light shielding masks according to the first embodiment and show a method of forming the light shielding masks 43 and 44 covering the connection regions 33 and 34.

The ribbon reflective members in the light reflection and diffraction elements (light reflection and diffraction element array) illustrated in FIG. 8 include six portions where the moveable ribbon reflective members and the fixed ribbon reflective members are inserted with each other in an inter digital form and show an example of a light reflection and diffraction element array for six pixels. Namely, each pixel is defined by the common electrode substrate 12 and the ribbon reflective members constituted by the moveable ribbon reflective members and the fixed ribbon reflective members located holding a predetermined distance from this common electrode substrate 12. Each three of the moveable ribbon reflective members and the fixed ribbon reflective members are connected to the common connecting portion at their one ends, whereby the connection regions 33 and 34 are formed. In FIG. 8, the light shielding masks 43 and 44 are not illustrated.

FIG. 9 is a plane view of the light reflection and diffraction element array formed with the light shielding masks 43 and 44 covering the connection regions 33 and 34.

The light shielding masks 43 and 44 are formed on the surface of an air-tight sealing glass plate 45 for protecting the light reflection and diffraction elements 23. The light shielding masks 43 and 44 are formed by conditions and materials able to block light components have a spatial frequency substantially matching with 1/p2 or including that frequency component to dimensions able to cover the connection regions 33 and 34.

A method of fabrication of such light shielding masks 43 and 44 will be illustrated next. For example, a resist pattern is prepared by general photolithography, then a metal such as Al, Cr, or Ni is deposited on the connection regions 33 and 34 by a method such as vapor deposition to form a thin film. Next, the metal on the resist is removed. For example, they can be easily prepared by lift off.

The material of the light shielding masks 43 and 44 is not limited to Al, Cr, and Ni and may be another material so far as the transmission of light can be suppressed.

As shown in FIG. 9, by forming the masks 43 and 44 on the glass 45, the connection regions 33 and 34 forming the interconnect structure are covered. The dimensions of the masks 43 and 44 may be dimensions able to substantially cover the connection regions 33 and 34, that is, dimensions not blocking the incident light upon the light reflection and diffraction elements 23. For example, a width w3 enabling the incidence of the incident light L1 in FIG. 9 becomes almost the same as the width w2 enabling incidence of the incident light L1 illustrated in FIG. 5. Here, w3 indicates the length of the restricted illumination region not covered by the masks 43 and 44 in FIG. 6 and upon which the incident light Li can be incident.

It is also possible that the light shielding masks 43 and 44 be formed on the surface on the glass 45 on the ribbon reflective member side or the surface of the opposite side to that. Further, even if not directly formed on the protection glass 45 of the ribbon reflective members, it is also possible to arrange the masks at locations in the vicinity of the ribbon reflective members where substantially the same light shielding mask effects can be obtained.

According to the first embodiment, a light reflection and diffraction element (light reflection and diffraction element array) 23 able to prevent the generation of unintended diffracted light in the connection regions 33 and 34 connecting the ribbon reflective members for feeding power can be provided.

When the image display device is constituted by using this light reflection and diffraction element (light reflection and diffraction element array) 23 as a grating type optical switching element and using the space filter 25 having the light transmission portions 25a and 25b after the light reflection and diffraction element 23, a further improvement of the contrast can be realized by their coaction.

Namely, the light reflection and diffraction element 23 having the ribbon reflective members 23A of the first embodiment can be applied to the formation of a light reflection and diffraction element array for a plurality of pixels explained referring to FIG. 8 and FIG. 9.

It is possible to use such a light reflection and diffraction element array for light reflection and diffraction elements 23 of the image display device explained by referring to FIG. 4 for use for forming an image by coaction with the space filter 25. Such an image display device can realize a further high contrast in addition to the advantages such as realization of a natural image expression by usage of the light reflection and diffraction elements, realization of natural color reproduction, high precision image formation, and high response.

Second Embodiment

A light reflection and diffraction element, a light reflection and diffraction element array, and an image display device using the light reflection and diffraction element array according to a second embodiment of the present invention will be explained next.

The second embodiment, in the same way as the first embodiment, solve the problem of generation of unintended diffracted light in the off state (first operation state) of a light reflection and diffraction element 23 for display of a black color, the increase in the amount of the light passing through the space filter due to the diffracted light, and therefore the drop in the contrast of the image display.

In the first embodiment, regions where the unintended diffraction phenomenon occurred in the off state of a light reflection and diffraction element were covered, but in the second embodiment, unintended diffraction of the light in the connection regions is avoided by reducing the area of the connection regions.

In the second embodiment as well, the basic configurations of the light reflection and diffraction element, the light reflection and diffraction element array, and the image display device are similar to those explained in the first embodiment.

Figure 10:
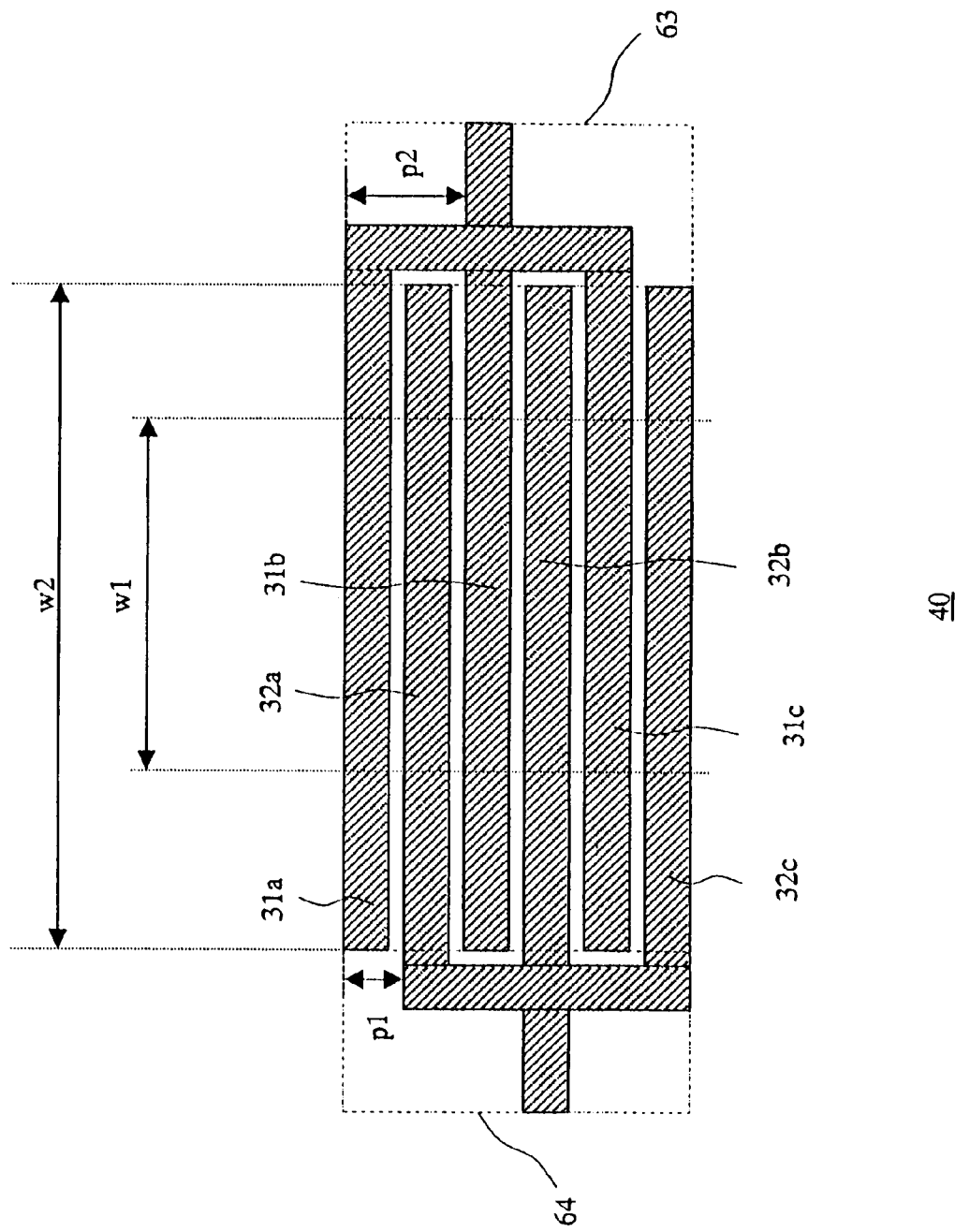
FIG. 10 is a view of the plane structure of the ribbon reflective members in a light reflection and diffraction element according to a second embodiment.

FIG. 10 is a view of the plane structure of ribbon reflective members 40 constituting a light reflection and diffraction element according to the second embodiment.

The light reflection and diffraction element of the second embodiment is constituted by the ribbon reflective members 40 illustrated in FIG. 10 and a common electrode substrate 12 (FIG. 1) located at a predetermined interval from the ribbon reflective members 40. Below, the second embodiment will be explained focusing on the ribbon reflective members 40.

In FIG. 10, the same reference numerals are used for same components as those of FIG. 6, and overlapping explanations will be omitted.

The ribbon reflective members 40 include a first group of moveable ribbon reflective members 31a, 31b, and 31c (31) and a second group of fixed ribbon reflective members 32a, 32b, and 32c (32) having mutually inserted comb structures (inter digital structure).

The groups of the ribbon reflective members are connected to common connecting portions at their ends and form connection regions 63 and 64. Here, the connection region 63 indicates the region to the right from the length portions of w2 of the moveable ribbon reflective members 31, while the connection region 64 indicates the region to the left from the length portions of w2 of the fixed ribbon reflective members 32.

In the portions inside of the connection regions 63 and 64, the ribbon reflective members belonging to the same group exhibit the cyclic structure p2 or the same as the cycle of the grating formed by the on state (second operation state) of the light reflection and diffraction element. If there are portions having a cycle on the structure of p2 in the connection regions 63 and 64, unintended diffracted light is produced even if the light reflection and diffraction element 40 is in the off state. If this light reflection and diffraction element 40 is used in the image display device, there is a possibility that the contrast will be lowered due to unintended diffracted light.

For this reason, in the second embodiment, the areas of the connection regions 63 and 64 of the ribbon reflective members 40 are reduced as much as possible so as to greatly reduce the amount of the unintended diffracted light generated in the connection regions 63 and 64 and thereby prevent a drop in the contrast.

Further, by using the light reflection and diffraction element (grating type optical switching element) of the second embodiment having the ribbon reflective members 40 greatly reducing the amount of the useless diffracted light generated in the connection regions 63 and 64 by reducing the areas of the connection regions 63 and 64 as much as possible and the space filter 25, due to their coaction, a further increase of the contrast of the image display device can be realized.

When working the light reflection and diffraction element of the second embodiment, particularly at the time of production of the ribbon reflective members 40, no new production process is required, so this can be easily realized in the same way as the first embodiment, and the cost does not increase.

The light reflection and diffraction element of the second embodiment can be applied to the formation of the light reflection and diffraction element array for a plurality of pixels explained by referring to FIG. 8 and FIG. 9.

It is possible to use such a light reflection and diffraction element array for the light reflection and diffraction elements 23 of the image display device explained by referring to FIG. 4 and use the same for the image formation by the coaction with the space filter 25. Such an image display device can realize a further higher contrast in addition to advantages such as realization of natural image expression by the usage of the light reflection and diffraction element, realization of natural color reproduction, high precision image formation, and high response.

Third Embodiment

Figure 11:
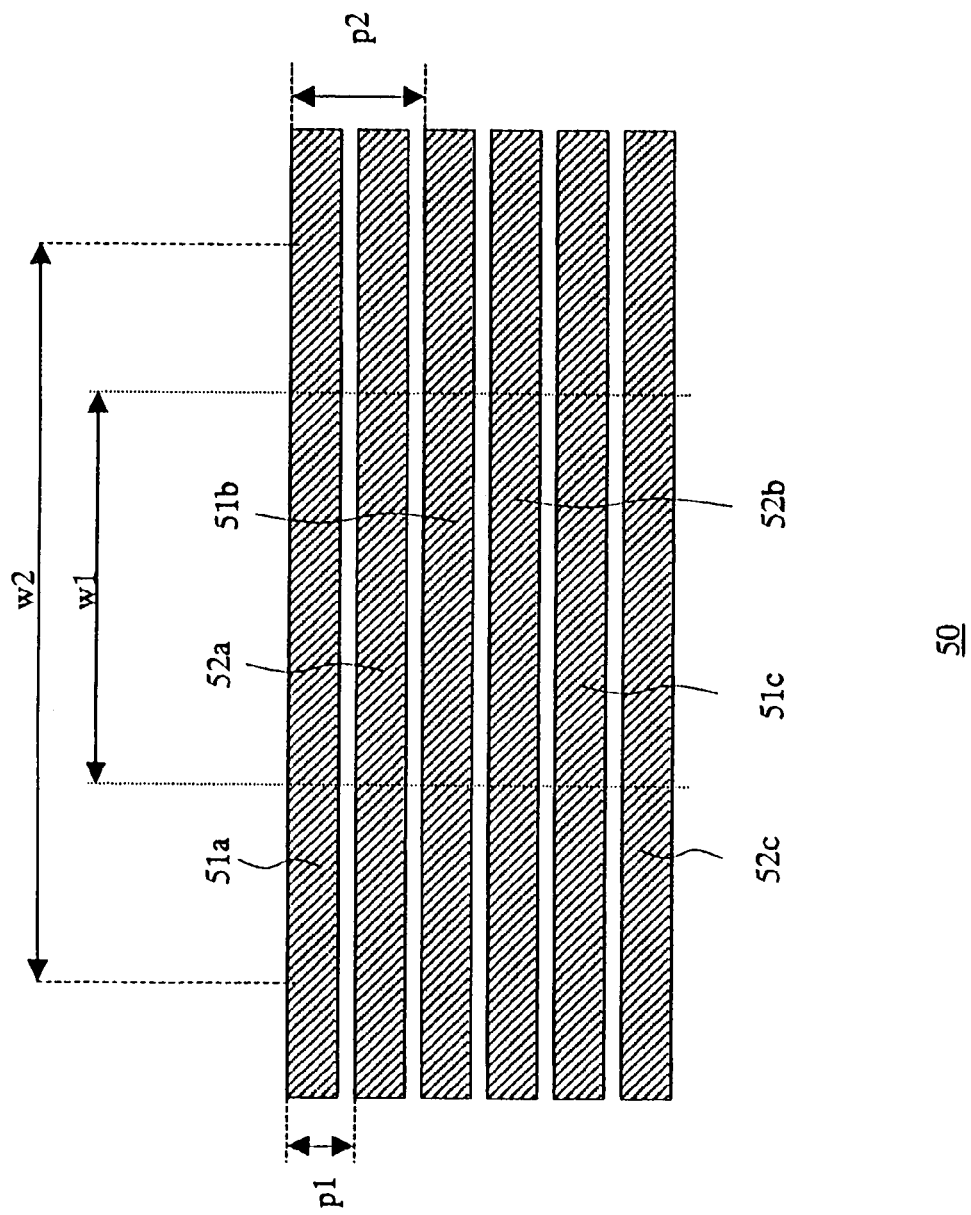
FIG. 11 is a view of the plane structure of the ribbon reflective members in a light reflection and diffraction element according to a third embodiment.

FIG. 11 is a view of the plane structure of ribbon reflective members 50 in the light reflection and diffraction element according to a third embodiment.

The light reflection and diffraction element of the third embodiment is configured by the ribbon reflective members 50 illustrated in FIG. 11 and a common electrode substrate 12 (FIG. 1) located at a predetermined interval from these ribbon reflective members 50. Below, the third embodiment will be explained focusing on the ribbon reflective members 50.

The third embodiment, in the same way as the first and second embodiments, also solves the problem of the occurrence of unintended diffraction of the illumination light incident when the light reflection and diffraction element is in the off state (first operation state), the increase of the amount of the light passing through the space filter due to the diffracted light, and the drop in the contrast of the image display.

In the third embodiment, by connecting individual ribbon reflective members in the light reflection and diffraction element independently to power feed lines and thereby not creating connection regions wherein the cycle on the structure becomes p2 such as with the ribbon reflective members in the light reflection and diffraction elements of the first and second embodiments, occurrence of unintended diffraction of the light is prevented.

In the third embodiment as well, the basic configurations of the light reflection and diffraction element, the light reflection and diffraction element array, and the image display device are similar to those explained in the first and second embodiments.

In FIG. 11, one pixel of a ribbon reflective members (GLV element) 50 of a one-dimensional array is constituted by six ribbon reflective members 51a, 52a, 51b, 52b, 51c, and 52c (indicated together as 50) parallel to each other. A first group of the ribbon reflective members 51a, 51b, and 51c (indicated together as 51) will be defined as the "moveable ribbon reflective members", and a second group of the ribbon reflective members 52a, 52b, and 52c (indicated together as 52) will be defined as the "fixed ribbon reflective members".

The ribbon reflective members of the moveable ribbon reflective members 51 and the ribbon reflective members of the fixed ribbon reflective members 52 are alternately arranged and exhibit an inter digital structure.

The groups of ribbon reflective members are cyclically arranged. A first reflection plane and a second reflection plane are formed by the ribbon reflective members belonging to the first and second groups.

Each ribbon reflective member has a structure of for example a silicon nitride film formed on its surface with aluminum film as a reflection surface.

Facing the ribbon reflective members 50, the common electrode 12 shown in FIG. 1 is arranged. Supports (not illustrated) for supporting the ribbon reflective member 50 while holding a certain interval from the common electrode 12 are formed at least at one position at both ends of the moveable ribbon reflective members 51 and the fixed ribbon reflective members 52.

When the drive voltage PWR is applied between the common electrode 12 and the moveable ribbon reflective members 51, each ribbon reflective member of the moveable ribbon reflective members 51 is attracted and moved (bent, displaces) to the common electrode 12 side due to the electrostatic force. For this reason, the first reflection plane of the moveable ribbon reflective members 51 and the second reflection plane of the fixed ribbon reflective members 52 become separated by exactly a predetermined distance causing diffraction, a reflection type grating taking a cyclic structure wherein the incident light is diffracted by the ribbon reflective members is formed, and thereby diffracted light is generated.

When configuring light reflection and diffraction elements having such ribbon reflective members 50 as the light reflection and diffraction element array illustrated in FIG. 8 or FIG. 9 and applying this light reflection and diffraction element array as the light reflection and diffraction elements 23 for the image display device illustrated in FIG. 4, the diffracted light generated in the light reflection and diffraction elements 23 is split at the space filter 25.

As shown in FIG. 11, the ribbon reflective members 51a, 52a, 51b, 52b, 51c, and 52c are not connected to each other. The interconnect portions to the ribbon reflective members are independent. For example, the interconnect portion to each ribbon reflective member is buried in the underlying portion at the end of the ribbon reflective member located outside of the portion w2 where the incident light Li strikes. Namely, in the ribbon reflective members 50 of the third embodiment, there are no portions corresponding to the connection regions 33 and 34 in the first embodiment or the connection regions 63 and 64 in the second embodiment.

The plane structure of the ribbon reflective member 50 is uniform. In the on state (second operation state) of the light reflection and diffraction element, a step difference is produced between the moveable ribbon reflective members 51 and the fixed ribbon reflective members 52 and the cycle (pitch) on the structure becomes p2 over the entire region of the ribbon reflective members 50. In the off state of the light reflection and diffraction element, there is no step difference between the moveable ribbon reflective members 51 and the fixed ribbon reflective members 52 and the cycle (pitch) on the structure becomes p1 over the entire region. Accordingly, by preventing unintended unrequired diffracted light from being generated in the region where the cycle on the structure is p2 in the off state of the light reflection and diffraction element, the drop of the contrast due to the unintended diffracted light in the off state of the light reflection and diffraction element can be reduced.

By using the light reflection and diffraction element of the grating type optical switching element of the third embodiment as the light reflection and diffraction element 23 and making it to cooperate with the space filter 25, the contrast of the image display device 20 can be further raised.

Namely, the light reflection and diffraction element of the third embodiment can be applied to the formation of the light reflection and diffraction element array for a plurality of pixels explained by referring to FIG. 8 and FIG. 9.

Such a light reflection and diffraction element array can be used for the light reflection and diffraction elements 23 of the image display device explained by referring to FIG. 4 and used for the image formation by the coaction with the space filter 25. Such an image display device can realize a further higher contrast in addition to the advantages such as realization of natural image expression by the usage of the light reflection and diffraction elements, realization of the natural color reproduction, high precision image formation, and high response.

Fourth Embodiment

The surface structure (surface roughness) of the reflection surfaces in the ribbon reflective members of a light reflection and diffraction element using a GLV element exerts a large influence on the contrast of the image display. This is because the scattered light intensity from the surface is strongly influenced by the uneven structure of the surface.

In the fourth embodiment, the surface structure of the reflection surfaces of the ribbon reflective members constituting a light reflection and diffraction element is improved to try to improve the contrast in the image display device using such a light reflection and diffraction element.

Each ribbon reflective member of the GLV element (light reflection and diffraction element) of the one-dimensional array shown in the first to third embodiments can be structured as a silicon nitride film on the surface of which is stacked an aluminum film as disclosed in for example U.S. Pat. No. 5,841,579 and U.S. Pat. No. 5,661,592.

In this case, the silicon nitride film is an amorphous film prepared by reduced pressure CVD, so does not have a grain structure. When the roughness value of the surface is represented by for example the root mean square (rms), the surface roughness value of the silicon nitride film is 2 nm (rms) or extremely small. Further, a silicon nitride film is stable in the surface roughness value even with respect to a temperature change. In this way, a silicon nitride film is preferred as the reflection material of the ribbon reflective members.

The surface roughness is generally expressed by the rms value. The smaller this value, the more uniform the surface, so the smaller the change in the intensity of the scattered light.

On the other hand, the aluminum film used for giving conductivity, elasticity, flexibility, etc. to the ribbon reflective member is a polycrystalline film, so grains exist, and, in general, the surface roughness value is relatively large. Further, the aluminum film is, in one aspect, unstable in comparison with a silicon nitride film, for example, it is easily influenced by a temperature change and regrowth of the grains occurs at a relatively low temperature of about 300° C.

The contrast when applying a light reflection and diffraction element (GLV element) using the ribbon reflective members of such a laminate structure of a silicon nitride film and aluminum film for a light reflection and diffraction element array for an image display device largely depends upon particularly the surface structure of the aluminum film. Namely, the contrast depends upon the change of the scattered light intensity due to the surface roughness of the aluminum film.

According to experiments, for example, the mean measured value of contrast at a light wavelength of 532 nm for 1080 pixels of flat grating optical valves having a surface roughness of the aluminum film in terms of rms of almost the same about 4 nm fluctuated within a range of about 2000:1 to 6000:1 according to the process conditions at the formation of the aluminum film. This result indicates that not only the rms value, but also other parameters largely contribute to the change in intensity of the scattered light.

The document J. M. Elson and J. M. Bennette, "Relation between the angular dependence of scattering and the statistical properties of optical surfaces", J. of Opt. Soc. Am., vol. 69 31–47 (1979)) shows that the light scattering intensity Is of a usual beta film material is related to the rms and a correlation length La of the surface roughness and can be expressed by the following Equation 3:

$$Is \propto (rms \times La)^2 \qquad (3)$$

where,
Is is the light scattering intensity, and
La is the correlation length of the surface roughness.

The "correlation length of the surface roughness" indicates a mean cycle of the unevenness formed on the surface (unevenness of grains formed by the grain structure).

It is considered from equation 3 that, in addition to the rms value, shortening of the correlation length La of the roughness is important in order to reduce the change in intensity of scattered light.

The correlation length La of the roughness is defined by the distance with which self correlation of a roughness profile attenuates to 1/e (e=2.718). This is substantially proportional to the grain size of the aluminum film in terms of physical properties. Accordingly, increasing the fineness of the grains is important. Based on such a consideration, the present inventors investigated the grating structure.

Figure 12:
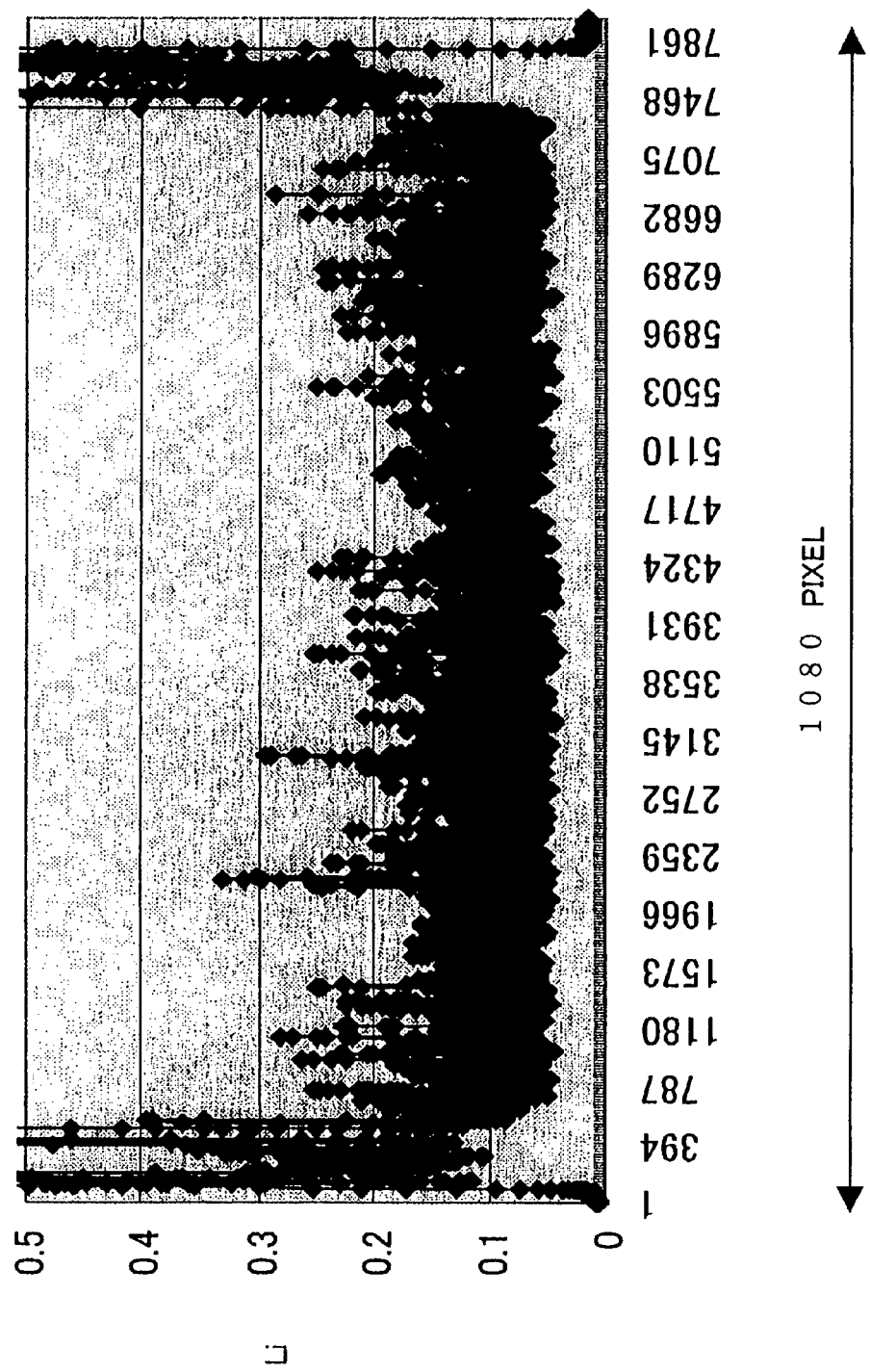
FIG. 12 is a graph of results of measurement of contrast when heating treating ribbon reflective members of the light reflection and diffraction element based on an embodiment of the present invention at about 300° C. for about 2 hours, then using this in an image display device as a light reflection and diffraction element.
Figure 13:
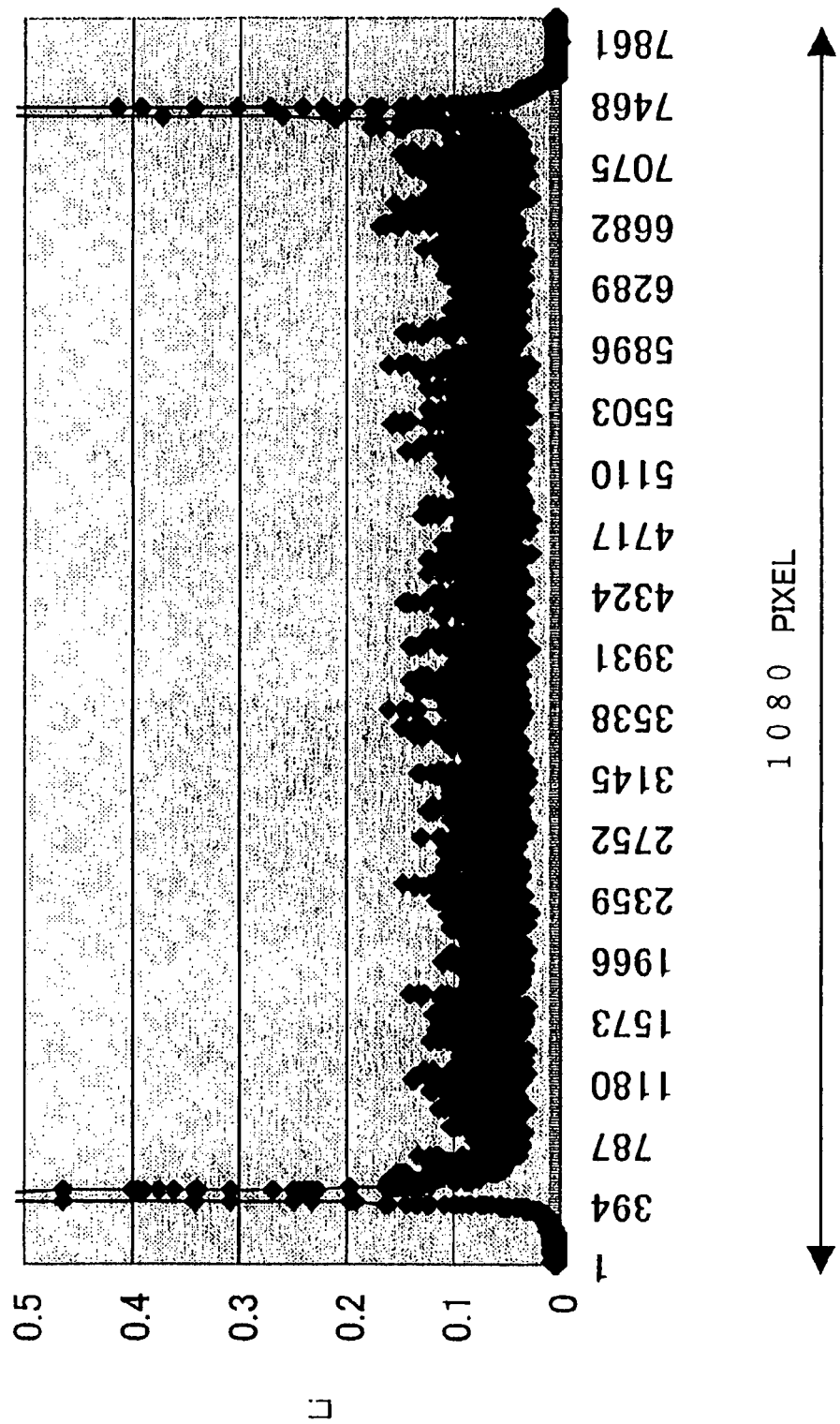
FIG. 13 is a graph of results of measurement of contrast when using ribbon reflective members constituting a light reflection and diffraction element at ordinary temperature.

FIG. 12 and FIG. 13 show experimental data indicating that the surface structure of the ribbon reflective members constituting a light reflection and diffraction element (GLV element) exerts an influence upon the contrast.

FIG. 12 shows the measurement results of the contrast when the ribbon reflective members of a light reflection and diffraction element are heat treated at about 300° C. for about 2 hours and then used for a light reflection and diffraction element in an image display device. In FIG. 12, the abscissa indicates the pixel of the light reflection and diffraction element and covers 1080 pixels in total. The ordinate indicates a relative value of the light intensity (intensity change) occurring when a light reflection and diffraction element is in the off state (first operation state). The lower the light intensity in the off state, the higher the contrast of the image by the image display device.

The contrast obtained from FIG. 12 is about 4000:1, while the rms value of the surface roughness of the ribbon reflective members is about 7 nm.

FIG. 13 shows the measurement results of the contrast when using the ribbon reflective members constituting a light reflection and diffraction element at ordinary temperature. In FIG. 13, the abscissa indicates the pixel of the GLV element of the light reflection and diffraction element and covers 1080 pixels in total. The ordinate indicates the relative value of the light intensity (intensity change) occurring when a light reflection and diffraction element is in the off state (first operation state).

The contrast obtained from FIG. 13 is about 6000:1, and the rms value of the surface roughness of the ribbon reflective members is about 7 nm, or almost no change from the case after the heat treatment.

Namely, this indicates that the rms value of the surface roughness of the ribbon reflective members constituting a light reflection and diffraction element does not change and that by just changing the temperature from 300° C. to ordinary temperature, the contrast is improved from about 4000:1 to 6000:1.

While the rms value of the surface roughness of the ribbon reflective members did not change, the grain sizes of the aluminum film become larger due to the heat treatment, so this change in contrast is considered to be mainly caused by the grain growth of the aluminum due to the heat treatment.

As described above, the aluminum film is easily influenced by temperature change, and the grains regrow even at a relatively low temperature of about 300° C. Due to this, the grain size grows large in the aluminum film, the correlation length in the aluminum film surface becomes long, and the change of intensity of the scattered light from the surface of the ribbon reflective member increases. As a result, the contrast is lowered.

Further, the grain growth occurs nonuniformly, so the fluctuation in contrast according to the location of the pixel in the light reflection and diffraction element array becomes large.

The increase in fineness of the grains optically speaking corresponds to an increase of the spatial frequency of the surface structure of the aluminum film. Accordingly, in the same way as the first to third embodiments, the spatial frequency of the surface structure of the aluminum film is made different from the structural spatial frequency (1/p2) of the grating formed when the light reflection and diffraction element (GLV element) is in the on state and the scattered light is shifted to the outside of the light transmission portions 25a and 25b of the space filter 25, whereby the change of the intensity of the scattered light passing through the space filter can be substantially suppressed.

On the other hand, it is preferred if the rms value of the roughness of the surface of the ribbon reflective members is reduced as much as possible in order to raise the contrast, but as shown here, the correlation length of the roughness profile can be controlled small by increasing reducing the grain size of the aluminum film so as to achieve a higher contrast.

According to the fourth embodiment, when there is a limit in the improvement of the contrast by reducing the rms value of the surface roughness of the aluminum film on the surface of the ribbon reflective members constituting the light reflection and diffraction element, by controlling the conditions of formation of the aluminum film so that the size of the crystal grains in the aluminum film is reduced, the correlation length of the surface roughness of the aluminum film is shortened and the contrast can be increased proportional to a reciprocal of the square of the correlation length.

Fifth Embodiment

The space filter used in the image display device in the present invention is not limited to the configuration illustrated in FIG. 5. For example, the present invention can also be applied to a case using a space filter passing the reflected light generated when the drive voltage PWR is not applied between the common electrode substrate 12 and the moveable ribbon reflective members as the space filter 25 illustrated in FIG. 4.

Figure 14:
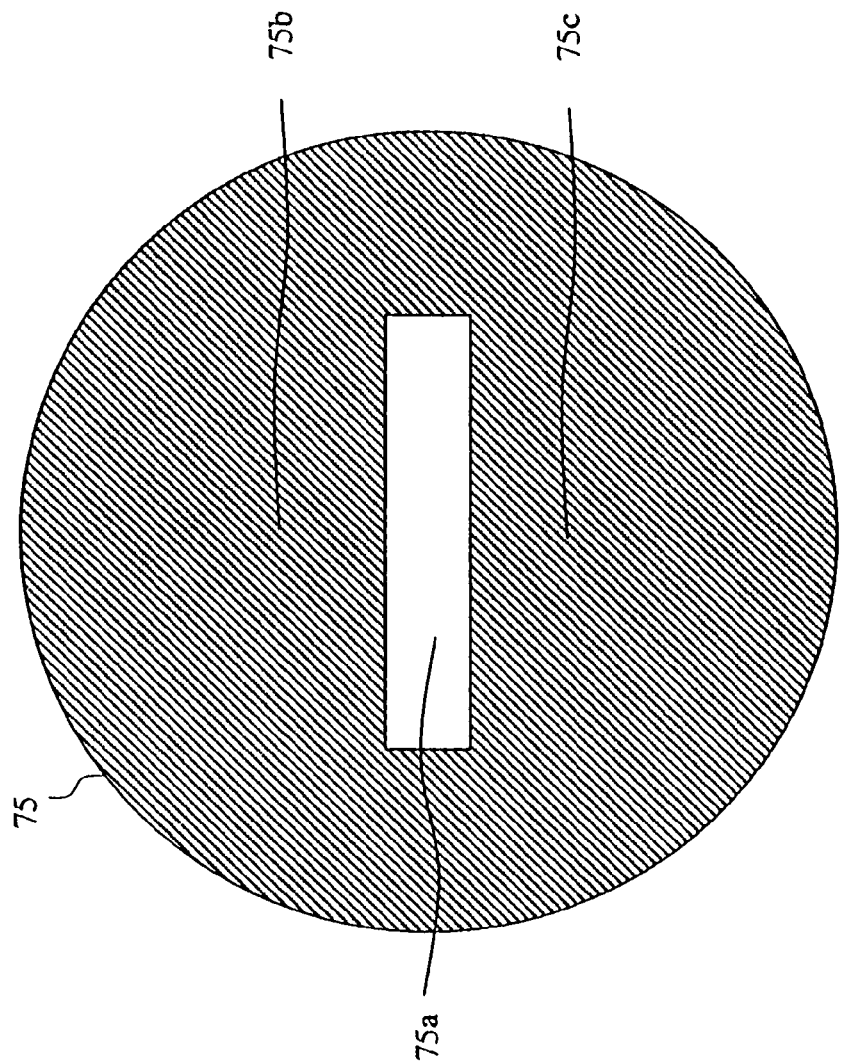
FIG. 14 is a front view of a space filter as a fifth embodiment of the present invention.

FIG. 14 shows an example of such a space filter. In FIG. 14, a space filter 75 has a light transmission portion 75a at the center and reflection portions 75b and 75c at the periphery thereof. In this case, the 0 order light remaining when the optimum voltage is applied in order to optimally generate the diffracted light between the common electrode substrate 12 and the ribbon reflective members, that is, so that the amount of flex (amount of fluctuation) of the moveable ribbon reflective members with respect to the fixed ribbon reflective members becomes $\lambda/4$ ($\lambda$ is the wavelength of the incident light Li) lowers the contrast.

In order to solve this problem, in the fifth embodiment, a method of making the length of the illumination regions in the length direction of the ribbon reflective members shorter than the length of the ribbon reflective members and reducing the connection regions wherein the cycle on the structure becomes p2 in the dark state, covering these connection regions, or independently connecting individual ribbon reflective members so as not to form regions where the cycle on the structure becomes p2 in the dark state is employed.

In the second and third methods, the spatial frequency per se of the structure of the connection portions includes the 0 order light component the same as the pass band of the space filter, but most of the secondary illumination light in the dark state (on state of the light reflection and diffraction element) is the primary light. As a result, the spatial frequency of the light is mainly comprised by the primary light, so cannot pass through the space filter.

Due to this, the drop of the contrast explained above can be reduced.

Above, the explanation was made based on the preferred embodiments of the present invention, but the present invention is not limited to the above explained embodiments. Various modifications are possible in a range not out of the gist of the present invention.

The image display device explained in the embodiments of the present invention is one example. Various modifications of the constitution thereof are possible. For example, the image displaying means is not limited to a screen and may be a photosensitive drum of a printer too. Namely, the light reflection and diffraction element and the light reflection and diffraction element array of the present invention are not limited in application to an image display device. The light reflection and diffraction element and the light reflection and diffraction element array of the present invention can be applied to also the other image display device or image forming apparatus such as the printer.

Further, in the image display device explained in the embodiments of the present invention, one pixel of the light reflection and diffraction element (GLV element) included six ribbon reflective members, but this is an example. The number may be more than six as well.

Further, in the present invention, the suppression of the scattered light exerting an influence upon the display by control of the surface structure is not limited to the case of the uneven structure of the surfaces of the ribbon reflective members explained in the fourth embodiment. For example, a great effect is also obtained by measures for dealing with the drop in the contrast of the grating type optical valves due to foreign matter, dust, and pattern defects on the surfaces of the ribbon reflective members, the protective glass plate in the vicinity thereof, etc. Namely, in the spatial distribution of these objects, by making the spatial frequency of each different from the spatial frequency of the grating formed when a light reflection and diffraction element is in the on state, the intensity of the scattered light passing through the space filter can be suppressed. Concretely, the effects of the present invention are obtained by reducing the dimensions of the foreign matter, dust, and pattern defects.

According to the present invention, a higher contrast of the image display device can be realized.

Further, according to the present invention, the unrequired diffraction of the light due to the spatially nonuniform secondary illumination light does not occur, so the nonuniform stripe-like noise of the display surface is prevented and the image quality can be enhanced.

Further, when there is a limit in the enhancement of the contrast of the image display by reducing the rms value of the surface roughness contributing to the reflection of the ribbon reflective members of the light reflection and diffraction element, by forming the reflective members so as to make the correlation length of the surface roughness shorter and by control so that for example the size of the crystal grains is reduced more, the contrast of the image can be enhanced in proportion to the reciprocal of the square of the correlation length thereof.

The light reflection and diffraction element of the present invention uses a GLV element. Therefore, the characteristics provided by a GLV element, for example, provision of a high precision image, formation of an image of a high image quality, and high speed response can be exhibited in addition to the above effects. Accordingly, when the light reflection and diffraction element or the light reflection and diffraction element array of the present invention is applied to an image display device etc., in addition to the enhancement of the contrast explained above, an image having a high precision, an image having a high image quality, and an image having a high response can be provided.

INDUSTRIAL APPLICABILITY

The light reflection and diffraction element and the light reflection and diffraction element array of the present invention can be applied to an image display device etc.

What is claimed is:

1. A light reflection and diffraction element for reflecting and/or diffracting incident light,
said light reflection and diffraction element having a common electrode substrate, a first group of a plurality of reflective members located facing the common electrode substrate and having light reflection characteristics, and a second group of a plurality of reflective members located facing said common electrode substrate and having light reflection characteristics, wherein
adjacent reflective members of said first group of a plurality of reflective members and adjacent reflective members of said second group of a plurality of reflective members are formed separated by a first cycle (pitch);
corresponding members of said first group of a plurality of reflective members and said second group of a plurality of reflective members are located in a plane adjacent to each other in an inter digital form by a second cycle (pitch);
a reflection plane of said first group of reflective members and a reflection plane of said second group of the reflective members become substantially the same reflection plane in a first state, while a reflection plane of said first group of reflective members and a reflection plane of said second group of reflective members are separated by exactly a distance for diffracting the incident light in a relationship between said first cycle and said second cycle in a second state; and
said element has an unrequired diffracted light generation preventing means for preventing, when the incident light is incident, unrequired diffracted light from being generated from a portion other than an effective region wherein corresponding members of said first group of a plurality of reflective members and said second group of a plurality of reflective members are located adjacent to each other;
wherein the reflection surfaces of said first group of reflective members and said second group of reflective members are formed with uneven surfaces having correlation lengths shorter than said predetermined cyclic structure.

2. A light reflection and diffraction element as set forth in claim 1, wherein
said common electrode substrate has conductivity,
said first group of reflective members have conductivity and elasticity and flexibility for displacing by exactly said distance and then returning,
said second group of reflective members have conductivity,
in said first state, said common electrode substrate and said first group of reflective members and said second group of reflective members are made the same potential, and
in said second state, said common electrode substrate and said second group of reflective members are made the same potential and a second voltage for separating said first group of reflective members by exactly said distance is applied between said first group of reflective members and said common electrode substrate.

3. A light reflection and diffraction element as set forth in claim 1, wherein
the element has:
a first power feeder for feeding power at first ends of said first group of a plurality of reflective members and
a second power feeder for feeding power at second ends of said second group of a plurality of reflective members, and
said unrequired diffracted light generation preventing means has a light shielding mask for preventing said incident light from striking upon said first end and second end.

4. A light reflection and diffraction element as set forth in claim 1, wherein:
each of said first group of reflective members has a first end, a second end facing said first end, and a first intermediate portion located between said first end and said second end;
each of said second group of reflective members has a third end approaching the first end of a reflective member belonging to said first group, a fourth end facing said third end, and a second intermediate portion located between said third end and said fourth end;
said element has:
a first common connecting portion for connecting said first ends of said first group of reflective members,
a second common connecting portion for connecting said fourth ends of said second group of reflective members,
a first power feeder for feeding power to said first common connecting portion, and
a second power feeder for feeding power to said second common connecting portion; and
said unrequired diffracted light generation preventing means includes light shielding masks encompassing said first common connecting portion and the first ends and said second common connecting portion and the fourth ends and covering parts of the first and second intermediate portions exhibiting a cyclic structure for diffracting the incident light.

5. A light reflection and diffraction element as set forth in claim 1, wherein:
said unrequired diffracted light generation preventing means includes:
a glass plate for protecting said first group of ribbon reflective members and said second group of ribbon reflective members and
light shielding masks on the arranged protection glass, encompassing said first common connecting portion and the first ends and said second common connecting portion and the fourth ends, and covering portions corresponding to parts of the first and second intermediate portions exhibiting a cyclic structure for diffracting the incident light.

6. A light reflection and diffraction element as set forth in claim 1, wherein said first group of a plurality of reflective members and said second group of a plurality of reflective members define a single pixel.

7. A light reflection and diffraction element array, wherein:
said element array has:
a common electrode substrate and
reflecting means defining a plurality of pixels;
a portion of said reflecting means defining one pixel has:
a first group of a plurality of reflective members located facing the common electrode substrate and having light reflection characteristics and
a second group of a plurality of reflective members located facing said common electrode substrate and having light reflection characteristics;
adjacent reflective members of said first group of a plurality of reflective members and adjacent reflective members of said second group of a plurality of reflective members are formed separated by a first cycle (pitch), while corresponding members of said first group of a plurality of reflective members and said second group of a plurality of reflective members are located in a plane adjacent to each other in an inter digital form by a second cycle (pitch);
a reflection plane of said first group of reflective members and a reflection plane of said second group of the reflective members become substantially the same reflection plane in a first state, while a reflection plane of said first group of reflective members and a reflection plane of said second group of reflective members are separated by exactly a distance for diffracting the incident light in a relationship between said first cycle and said second cycle in a second state; and
said element array has an unrequired diffracted light generation preventing means for preventing, when the incident light is incident, unrequired diffracted light from being generated from a portion other than an effective region wherein corresponding members of said first group of a plurality of reflective members and said second group of a plurality of reflective members are located adjacent to each other;
wherein the reflection surfaces of said first group of reflective members and said second group of reflective members are formed with uneven surfaces having correlation lengths shorter than said predetermined cyclic structure.

8. A light reflection and diffraction element array as set forth in claim 7, wherein
said common electrode substrate has conductivity,
said first group of reflective members have conductivity and elasticity and flexibility for displacing by exactly said distance and then returning,
said second group of reflective members have conductivity,
in said first state, said common electrode substrate and said first group of reflective members and said second group of reflective members are made the same potential, and
in said second state, said common electrode substrate and said second group of reflective members are made the same potential and a second voltage for separating said first group of reflective members by exactly said distance is applied between said first group of reflective members and said common electrode substrate.

9. A light reflection and diffraction element array as set forth in claim 7, wherein the element array has:
a first power feeder for feeding power at first ends of said first group of a plurality of reflective members and
a second power feeder for feeding power at second ends of said second group of a plurality of reflective members, and
said unrequired diffracted light generation preventing means has a light shielding mask for preventing said incident light from striking upon said first end and second end.

10. A light reflection and diffraction element array as set forth in claim 7, wherein:
each of said first group of reflective members has a first end, a second end facing said first end, and a first intermediate portion located between said first end and said second end;
each of said second group of reflective members has a third end approaching the first end of a reflective member belonging to said first group, a fourth end facing said third end, and a second intermediate portion located between said third end and said fourth end;
said element has:
a first common connecting portion for connecting said first ends of said first group of reflective members,
a second common connecting portion for connecting said fourth ends of said second group of reflective members,
a first power feeder for feeding power to said first common connecting portion, and
a second power feeder for feeding power to said second common connecting portion; and
said unrequired diffracted light generation preventing means includes light shielding masks encompassing said first common connecting portion and the first ends and said second common connecting portion and the fourth ends and covering parts of the first and second intermediate portions exhibiting a cyclic structure for diffracting the incident light.

11. A light reflection and diffraction element array as set forth in claim 7, wherein:
said unrequired diffracted light generation preventing means includes:
a glass plate for protecting said first group of ribbon reflective members and said second group of ribbon reflective members and light shielding masks on the arranged protection glass, encompassing said first common connecting portion and the first ends and said second common connecting portion and the fourth ends, and covering portions corresponding to parts of the first and second intermediate portions exhibiting a cyclic structure for diffracting the incident light.

12. An image display device, said device having:
a light source,
a light reflection and diffraction element array for reflecting or diffracting the incident light from the light source in accordance with an image signal to be displayed,
a space filter for transmitting or reflecting the diffracted light from the light reflection and diffraction element array, and
a scanning means for scanning the light from the space filter and converting it to a two-dimensional image;
said light reflection and diffraction element array has a common electrode substrate and a reflecting means defining a plurality of pixels;
a portion of said reflecting means defining one pixel has a first group of a plurality of reflective members located facing the common electrode substrate and having light reflection characteristics and a second group of a plurality of reflective members located facing said common electrode substrate and having light reflection characteristics;
adjacent reflective members of said first group of a plurality of reflective members and adjacent reflective members of said second group of a plurality of reflective members are formed separated by a first cycle (pitch), while corresponding members of said first group of a plurality of reflective members and said second group of a plurality of reflective members are located in a plane adjacent to each other in an inter digital form by a second cycle (pitch);
a reflection plane of said first group of reflective members and a reflection plane of said second group of the reflective members become substantially the same reflection plane in a first state, while a reflection plane of said first group of reflective members and a reflection plane of said second group of reflective members are separated by exactly a distance for diffracting the incident light in a relationship between said first cycle and said second cycle in a second state; and
said element array has an unrequired diffracted light generation preventing means for preventing, when the incident light is incident, unrequired diffracted light from being generated from a portion other than an effective region wherein corresponding members of said first group of a plurality of reflective members and said second group of a plurality of reflective members are located adjacent to each other
wherein the reflection surfaces of said first group of reflective members and said second group of reflective members are formed with uneven surfaces having correlation lengths shorter than said predetermined cyclic structure.

13. An image display device as set forth in claim 12, wherein:
said common electrode substrate of said light reflection and diffraction element array has conductivity, said first group of reflective members have conductivity and elasticity and flexibility for displacing by exactly said distance and then returning, said second group of reflective members have conductivity,
in said first state, said common electrode substrate and said first group of reflective members and said second group of reflective members are made the same potential, and in said second state, said common electrode substrate and said second group of reflective members are made the same potential and a second voltage for separating said first group of reflective members by exactly said distance is applied between said first group of reflective members and said common electrode substrate.

14. An image display device as set forth in claim 13, wherein:
the element array has a first power feeder for feeding power at first ends of said first group of a plurality of reflective members and a second power feeder for feeding power at second ends of said second group of a plurality of reflective members, and
said unrequired diffracted light generation preventing means has a light shielding mask for preventing said incident light from striking upon said first end and second end.

15. An image display device as set forth in claim 12, wherein:
each of said first group of reflective members has a first end, a second end facing said first end, and a first intermediate portion located between said first end and said second end;
each of said second group of reflective members has a third end approaching the first end of a reflective member belonging to said first group, a fourth end facing said third end, and a second intermediate portion located between said third end and said fourth end;
said element array has:
a first common connecting portion for connecting said first ends of said first group of reflective members,
a second common connecting portion for connecting said fourth ends of said second group of reflective members,
a first power feeder for feeding power to said first common connecting portion, and
a second power feeder for feeding power to said second common connecting portion; and
said unrequired diffracted light generation preventing means includes light shielding masks encompassing said first common connecting portion and the first ends and said second common connecting portion and the fourth ends and covering parts of the first and second intermediate portions exhibiting a cyclic structure for diffracting the incident light.

16. An image display device as set forth in claim 15, wherein:
said unrequired diffracted light generation preventing means includes:
a glass plate for protecting said first group of ribbon reflective members and said second group of ribbon reflective members and
light shielding masks on the arranged protection glass, encompassing said first common connecting portion and the first ends and said second common connecting portion and the fourth ends, and covering portions corresponding to parts of the first and second intermediate portions exhibiting a cyclic structure for diffracting the incident light.

17. An image display device as set forth in claim 12, wherein said space filter is configured so as to reflect 0 order light from said light reflection and diffraction element array and so as to allow passage of at least ±1 order light.

18. An image display device as set forth in claim 12, wherein said space filter is configured so as to allow passage of 0 order light from said light reflection and diffraction element array and so as not to allow passage of ±1 order light.

* * * * *